United States Patent
Goyon et al.

(10) Patent No.: US 12,408,625 B2
(45) Date of Patent: Sep. 9, 2025

(54) FOOD BOWL KIT

(71) Applicant: MARS, INCORPORATED, McLean, VA (US)

(72) Inventors: Annabelle Goyon, Aimargues (FR); Sandrine Vialle, Aimargues (FR); Melanie Trehiou, Aimargues (FR); Mathieu Mao, Aimargues (FR); Tammie King, Leicestershire (GB); Alysia Hunt, Leicestershire (GB); Emily Marshall, Leicestershire (GB); Lewis Jones, Northhamptonshire (GB)

(73) Assignee: MARS, INCORPORATED, McLean, VA (US)

( * ) Notice: Subject to any disclaimer, the term of this patent is extended or adjusted under 35 U.S.C. 154(b) by 0 days.

(21) Appl. No.: 17/769,371

(22) PCT Filed: Oct. 30, 2020

(86) PCT No.: PCT/US2020/058288
§ 371 (c)(1),
(2) Date: Apr. 15, 2022

(87) PCT Pub. No.: WO2021/087309
PCT Pub. Date: May 6, 2021

(65) Prior Publication Data
US 2024/0130326 A1  Apr. 25, 2024
US 2024/0224934 A9  Jul. 11, 2024

(30) Foreign Application Priority Data
Oct. 31, 2019 (EP) ..................................... 19206648
May 7, 2020 (EP) ..................................... 20173532

(51) Int. Cl.
*A01K 5/00* (2006.01)
*A01K 5/01* (2006.01)
(Continued)

(52) U.S. Cl.
CPC ............ *A01K 5/0114* (2013.01); *A23K 20/10* (2016.05); *A23K 50/45* (2016.05); *A23K 50/48* (2016.05)

(58) Field of Classification Search
CPC ....... A01K 5/01; A01K 5/0114; A01K 5/0135
(Continued)

(56) References Cited

U.S. PATENT DOCUMENTS 3,679,429 A    7/1972  Mohrman et al.
5,526,773 A *  6/1996  Richardson .......... A01K 5/0135
                                                248/156
(Continued)

FOREIGN PATENT DOCUMENTS

CN    205568521     *  9/2016
EP    3 578 040 A1    12/2019
(Continued)

OTHER PUBLICATIONS

Hautala, "Improving the Palatability of Minitablets for Feline Medication," Helsinki: University of Helsinki, 72 pp. (2017).
(Continued)

*Primary Examiner* — David J Parsley
(74) *Attorney, Agent, or Firm* — Baker Botts L.L.P.

(57) ABSTRACT

The present disclosure relates to a kit comprising: (i) a first part comprising a food bowl assembly including a first bowl having side walls and a base; a second feeding bowl disposed within the first bowl, the second feeding bowl having side walls and a solid base, the inner surface of said side walls and solid base being a closed surface; a separating module adapted to hold an olfactive product, the separating module being arranged to fit between the solid base of the second feeding bowl and the first bowl, and a vent arranged to allow odours from the separating module to exit the food bowl assembly between the first bowl and the side walls of (Continued)

the second feeding bowl so that odours do not pass through the second feeding bowl; and (ii) a second part comprising of a container comprising at least one olfactive product. A second aspect of the present disclosure relates to a kit as defined above for use in a method for to treat olfaction dysfunction, appetite loss or food aversion due to a disease or for treating and/or preventing a disease or disorder in an animal.

20 Claims, 3 Drawing Sheets

(51) Int. Cl.
  *A23K 20/10* (2016.01)
  *A23K 50/45* (2016.01)
  *A23K 50/48* (2016.01)
(58) Field of Classification Search
  USPC .............................................. 119/61.5, 61.52
  See application file for complete search history.

(56) References Cited

U.S. PATENT DOCUMENTS

| | | | | |
|---|---|---|---|---|
| 5,709,168 | A * | 1/1998 | Walker | A01K 5/0128 |
| | | | | 119/61.5 |
| 5,730,083 | A * | 3/1998 | Walker | A01K 5/0142 |
| | | | | 83/699.61 |
| 6,314,911 | B1 | 11/2001 | Kaytovich | |
| 6,660,319 | B1 | 12/2003 | Shi et al. | |
| 7,856,944 | B1 * | 12/2010 | Stauffer | A01K 5/0114 |
| | | | | 119/61.5 |
| 9,545,081 | B2 * | 1/2017 | Nolan | A01K 5/0114 |
| 10,791,710 | B1 * | 10/2020 | White | A01K 15/02 |
| 11,154,033 | B2 * | 10/2021 | Houx | A01K 5/0114 |
| 2005/0056226 | A1 * | 3/2005 | Ruggiero | A01K 5/0135 |
| | | | | 119/61.52 |
| 2005/0112259 | A1 | 5/2005 | Qvyjt | |
| 2008/0299286 | A1 | 12/2008 | Josephson et al. | |
| 2009/0050633 | A1 | 2/2009 | Knapp | |
| 2011/0180006 | A1 * | 7/2011 | McGowan | A01K 39/014 |
| | | | | 119/61.54 |
| 2017/0127647 | A1 * | 5/2017 | Owens, III | A01K 5/0114 |

FOREIGN PATENT DOCUMENTS

| | | |
|---|---|---|
| JP | 3092795 U | 3/2003 |
| JP | 3148494 U | 2/2009 |
| KR | 101 357 504 B1 | 2/2014 |
| WO | WO 2005/053421 A2 | 6/2005 |
| WO | WO 2005/104290 A2 | 11/2005 |
| WO | WO 2007/109761 A2 | 9/2007 |
| WO | WO2010/018365 A1 | 2/2010 |
| WO | WO 2010/138372 A2 | 12/2010 |
| WO | WO2017/082987 A1 | 5/2017 |

OTHER PUBLICATIONS

Pétel et al., "A new method to assess the influence of odor on food selection in dogs," J. Sens. Stud., 33:e12311 (2018).
International Search Report mailed Feb. 1, 2021 in International Application No. PCT/US2020/058288.
Buttery et al., "Studies on Popcorn Aroma and Flavor Volatiles," Journal Of Agricultural And Food Chemistry, 45:837-843 (1997).
Calkins et al., "A fresh look at meat flavor," Meat Science, 77:63-80 (2007).

* cited by examiner

FOOD BOWL KIT

CROSS-REFERENCE TO RELATED APPLICATIONS

This application is a U.S. National Stage Patent Application under 35 U.S.C. § 371 of International Patent Application No. PCT/US2020/058288, filed on Oct. 30, 2020, which claims priority to European patent application no. EP 19206648.8, filed on Oct. 31, 2019 and European patent application no. EP 20173532.1, filed on May 7, 2020, the contents of each of which is are incorporated herein by reference in its entirety in their entireties, and to each of which priority is claimed.

FIELD OF THE INVENTION

The present disclosure relates to the field of food intake and/or food aversion. Specifically, the present disclosure relates to a kit comprising a food bowl assembly (FBA) and an olfactive product for increasing the palatability of products with high nutritional constraints.

BACKGROUND

Odour plays a role, along with taste, in a mammal's, such an animal's preference or aversion to a food type. Odour is the primary cue in attracting a mammal to a food composition or causing it to not approach. If a mammal is not attracted to the food supplied to it, the food may not consume sufficient amounts to maintain health or well-being. The food composition may be wasted or left unconsumed for extended periods of time, causing the food to become stale or contaminated. For example, cats in particular, can be particularly fastidious eaters. Thus, a problem of food refusal or aversion problem can result.

Food refusal or aversion is the alteration of eating behaviour for psychological reasons. It may manifest as psychological food intolerance, where there is an adverse physical reaction associated with the ingestion of a particular food, or food avoidance.

Considering that, food aversion is an issue for mammal treatments since the mammal refuses to eat the diet often caused by a post ingestive symptom such as vomiting, diarrhea, nausea, or an anallergic and hypoallergenic diets where traditional palatants cannot be use (due to their content of protein which can cause allergic reactions). However, the non or low palatants diets cannot be changed regarding strict nutrition constraints. Thus, the mammal such an animal, is unable to be treated since it has no attraction to eat the food.

Particularly, many mammals such animals such as pets, have problems or disease caused by loss of attractiveness for food or by food aversion. Some of these diseases include but are not limited to obesity, anorexia, renal disease, hypertension, heart disease, chronic food allergies, severe osteoarthritis, diabetes mellitus, urinary incontinence, bladder stones, chronic urinary tract infections, gastroenteritis, pancreatitis, hypothyroidism, and other disorders.

In its specification, WO2017/082987 describes a food bowl system, designed to encourage a mammal to feed a healthy diet by allowing attractive aroma-producing materials, such as heated meat, to be positioned below the food. Aromas from the material are able to permeate up through the food by way of perforations in the lower surface of the feeding bowl and therefore may enhance the attractiveness of the food composition to the mammal.

In addition, C. Pétel et al. J. Sens. Stud. 2018, 33:e12311 describes a method for assessing the influence of odour on food selection in dogs, which utilises a false bottom bowl. Each bowl comprised a conventional feeding bowl, into which a stainless-steel separation plate having drilled holes arranged across the entire surface was placed. This separated the bowls into an outer and inner compartment. Different odorant materials were then placed into each lower compartment, and similar amounts of food composition placed in each outer compartment. The odour from the lower compartment passed through the drilled holes and through the food layer, and thus influenced a dog's selection of bowl to eat from.

The aim of those documents is to mix the flavor from odorant materials with the flavor of dry diet which creates an attractive odour for cats and dogs without being part of the diet. These methods allow to use diverse palatants without consumption by pets.

However, in either case such food bowl assembly can only be used with essentially dry food products such as kibbles or treats, as liquids from wet foods, milk, soup, porridge, etc. may drip or leak through the perforations in the bowl and so contaminate the aroma-producing substance. Since some mammals may prefer the texture of wet food, this provides a limitation on the use of the food bowl assembly. Moreover, flavor has to cross the kibbles which can modify the global aroma perceived by the pet and also involves a transformation/reaction when aroma goes through the diet.

Furthermore, these food bowl assembly encourages food waste since the odorous product is taken directly from the pet owner's fridge.

Consequently, there remain a need to provide a product and method to increase the palatability of food with high nutritional constraints and/or to avoid and treat food aversion and the resulting diseases or disorders.

As a result, the present disclosure aims to resolve these problems.

The present disclosure is also useful to diversify product smell and propose a new product in case of a food refusal or aversion, for renal disease for example. The inventors created a range with different flavours. Adding an olfactive product under the food, such as in the case of a pet, the kibbles and/or wet food or other such as for example milk, soup, porridge is an economic and environmentally friendly way to propose variety to the mammal and make the mammal agree to eat the diet again.

SUMMARY OF THE INVENTION

A first aspect of the present disclosure relates to a kit including: (i) a first part having a food bowl assembly, said food bowl assembly including a first bowl having side walls and a base; a second feeding bowl disposed within the first bowl, the second feeding bowl having side walls and a solid base, the inner surface of said side walls and solid base being a closed surface; a separating module adapted to hold an olfactive product, the separating module being arranged to fit between the solid base of the second feeding bowl and the first bowl, and a vent arranged to allow odours from the separating module to exit the food bowl assembly between the first bowl and the side walls of the second feeding bowl so that odours do not pass through the second feeding bowl; and (ii) a second part having a container comprising at least one olfactive product.

A second aspect of the present disclosure relates to a kit as defined above for use in a method for stimulating appetite of a mammal, especially of an ageing or a senior mammal.

A third aspect of the present disclosure relates to a kit as defined above for use in a method for treating and/or preventing food aversion in a mammal, especially a mammal suffering from a disease or a disorder that causes food aversion, loss of attractiveness to food and/or loss of appetite in the said mammal. Also, according to this second aspect, the present disclosure relates to a kit as defined above for use in a method for treating and/or preventing a disease or a disorder in a mammal, which disease or disorder being caused by food aversion.

A fourth aspect of the present disclosure relates to a kit as defined above for use in a method for increasing the attractiveness of a food composition, especially a low palatability food composition.

Another aspect of the present disclosure relates to a method for preventing food aversion in a mammal, said method including the steps of (i) providing a kit according to the present disclosure, (ii) placing an olfactive product in the separating module of the food bowl assembly, (iii) placing a food composition in the second feeding bowl of the bowl assembly, and (iv) allowing a mammal to access the food bowl assembly.

Figure 1:
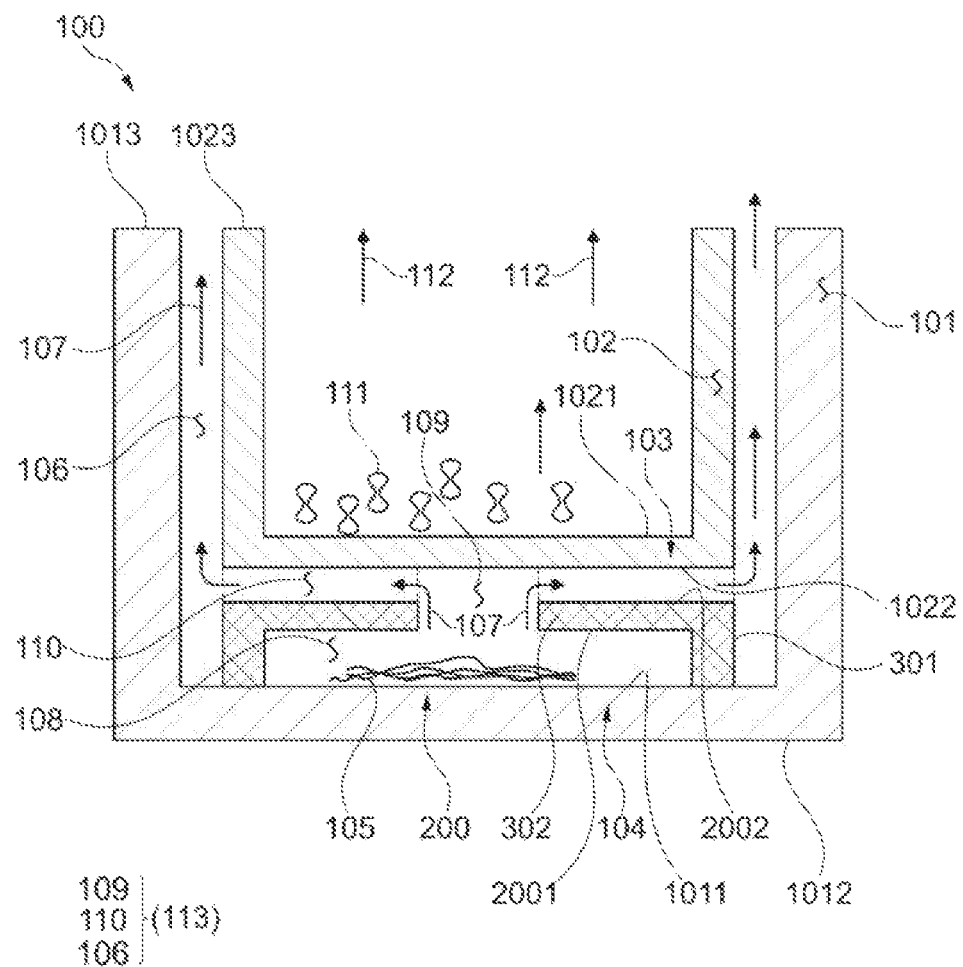
FIG. 1 illustrates a cross-section of a food bowl assembly as described in the present disclosure.

The following is a list of the major elements in the figures in numerical order.

100 Food bowl assembly
101 First bowl
1011 Inner surface of the first bowl
1012 Outer surface of the first bowl
1013 Upper end of the wall of the first bowl
102 Second feeding bowl
1021 Inner surface of the second feeding bowl
1022 Outer surface of the second feeding bowl
1023 Upper end of the wall of the second feeding bowl
103 Solid base of the second feeding bowl
104 Base of the first bowl
105 Olfactive product
106 Gap
107 Odours of olfactive product
108 Odour chamber or cavity
109 Opening of the separating module
110 Channel
111 Food composition
112 Odours of food
113 Vent (106+109+110)
200 Separating module
2001 Inner surface of the separating module
2002 Outer surface of the separating module
301 Supporting legs of the separating module
302 Supporting regions of the separating module
303 Edges of the separating module

DETAILED DESCRIPTION

The present disclosure aims at making available a kit for use in a method for treating and/or preventing food aversion in a mammal wherein a food composition adapted for treating and/or preventing the said disease or the said disorder causes a loss of attractiveness or a food aversion in the said mammal due to its reduced palatability i.e. low palatability food composition. In some embodiments, the present disclosure provides a kit for use in a method for treating and/or preventing food aversion in a mammal with a disease or disorder. The present disclosure also aims at making available a kit for use in a method for treating and/or preventing a disease or disorder in a mammal caused by food aversion.

Another advantage of the present disclosure is to provide a simple solution to the pet owner to feed his or her pet with an olfactive product adapted to the pet. Using the kit according to the disclosure allows not only the rapid and easy selection of a specific olfactive product for a pet but also the continuous use of said olfactive product for everyday feeding of said pet.

The inventors provide herein a kit including: (i) a first part including a food bowl assembly and (ii) a second part including a container comprising at least an olfactive product.

Surprisingly, the inventors have found that the kit of the present disclosure is capable of acting on the feeding behaviour of mammals.

As it is shown in the examples herein, such a kit, when used for presenting food composition to a mammal who usually refuses to eat, preferably an animal currently in treatment with a low palatability food composition without the possibility to change the diet regarding strict nutrition constraints, causes the mammal to finally eat its food composition, including causes the mammal to finally eat entirely the food composition which is provided.

Specifically, the kit according to the present disclosure may overcome food aversion by targeting the mammal's olfactory bulb with an olfactive product in such a way that the mammal is enticed to eat the food composition, and especially is enticed to eat the food composition without food waste.

Further, it is shown herein that the mammal significantly preferred eating a food composition. i.e. a low palatability food composition, in the food bowl assembly comprising an olfactive product as described in the present disclosure, rather than in the same food bowl assembly which does not comprise an olfactive product according to the present disclosure.

Consequently, the inventors found that the kit according to the present disclosure provides a therapeutic way for avoiding food aversion or treating food aversion in mammals, such as animals, and thus induces the said mammal to eat a food adapted for treating and/or preventing a disease or disorder although the said adapted food is of reduced palatability, i.e. low palatability food composition.

Therefore, the inventors found that the kit of the present disclosure allows to overcome the drawbacks of providing to a mammal, such as an animal, a food composition endowed with reduced palatability. Otherwise said, using the kit according to the present disclosure allows in some aspects increasing the palatability of a food composition, particularly the palatability of a food composition such as for example food composition having a low palatability, including an unpalatable food composition, e.g. a hypoallergenic diet or an anallergic diet.

Accordingly, the present disclosure relates to a kit including:
(i) a first part including a food bowl assembly, said food bowl assembly including:
 (a) a first bowl;
 (b) a second feeding bowl disposed within the first bowl and intended to receive food;

(c) a separating module arranged to fit between the second feeding bowl and the first bowl and intended to receive an olfactive product; and (d) a vent arranged to allow odors from olfactive product within the separating module to exit the food bowl without passing through the food within the second feeding bowl; and (ii) a second part including a container comprising at least one olfactive product.

In an embodiment, the disclosure relates to a kit comprising:

(i) a first part consisting of a food bowl assembly, said food bowl assembly comprising:

(a) a first bowl comprising side walls and a base;

(b) a second feeding bowl disposed within the first bowl, the second feeding bowl comprising side walls and a solid base, the inner surface of said side walls and solid base being a closed surface, (c) a separating module adapted to hold an olfactive product, the separating module being arranged to fit between the solid base of the second feeding bowl and the first bowl, and (d) a vent arranged to allow odours from the separating module to exit the food bowl assembly between the first bowl and the side walls of the second feeding bowl so that odours do not pass through the second feeding bowl; and (ii) a second part consisting of a container comprising at least one olfactive product.

First Part: Food Bowl Assembly

The kit of the present disclosure includes a first part comprising a food bowl assembly. In an embodiment, the kit of the present disclosure includes a first part including a food bowl assembly comprising. In an embodiment, the kit of the present disclosure includes a first part which consists of a food bowl assembly.

A food bowl assembly according to the present disclosure includes:

(a) a first bowl having side walls and a base;

(b) a second feeding bowl disposed within the first bowl, the second feeding bowl having side walls and a solid base, the inner surface of said side walls and solid base being a closed surface;

(c) a separating module adapted to hold an olfactive product, the separating module being arranged to fit between the solid base of the second feeding bowl and the first bowl; and (d) a vent arranged to allow odors from olfactive product within the separating module to exit the food bowl assembly between the first bowl and the side walls of the second feeding bowl so that odors do not pass through the second feeding bowl.

The second feeding bowl includes a wall having an inner surface and an outer surface. The inner surface of the wall of the second feeding bowl is aimed at containing a food composition. The outer surface of the wall of the second feeding bowl, within the food bowl assembly, is facing the wall of the first bowl. In some embodiments, the wall of the second feeding bowl includes a horizontal bottom wall and vertical side walls, as shown in the figures of the present disclosure.

The food bowl assembly of the kit of the present disclosure may be used with all types of food compositions, including more particularly for pet food, liquid, wet, semi-moist and dry food compositions, since the second feeding bowl has a solid base and so there will be no leakage of a food composition that will be placed therein. Especially, the inner surface of the bottom of the second feeding bowl which is aimed at receiving a food composition is a closed surface, i.e. the said bottom surface does not contain any hole or opening that would bring into contact the content of the second feeding bowl with the content of the first bowl or of the separating module.

The separating module is positioned above the first bowl and separates (i) the second feeding bowl from (ii) the first bowl, the said first bowl being dedicated at receiving an olfactive product. For the sake of clarity, in a food bowl assembly according to the present disclosure, the second feeding bowl, which is dedicated to receiving a food composition, is positioned above the separating module.

In embodiments of the first bowl, the said first bowl includes a wall having an inner surface and an outer surface. The inner surface of the wall of the first bowl is aimed at containing an olfactive product. The outer surface of the wall of the first bowl may also consist, in some preferred embodiments, of the outer surface of the food bowl assembly. In some embodiments, the wall of the first bowl includes a horizontal bottom wall and vertical side walls, as shown in the figures of the present disclosure.

In preferred embodiments of the food bowl assembly of the kit according to the present disclosure, the separating module includes a wall having an inner surface and an outer surface, wherein the inner surface faces the bottom of the first bowl and wherein the outer surface faces the bottom of the second feeding bowl.

In most preferred embodiments, the inner surface of the bottom of the first bowl delimits, with the inner surface of the separating module, a volume where the olfactive product may evaporate and then exit towards a vent, which vent comprises a proximal zone and a distal zone. The said volume, which forms a cavity, may be termed the "odour chamber" herein. The proximal zone of the vent is delimited by the outer surface of the separating module and the outer surface of the bottom of the second feeding bowl. The distal zone of the vent is delimited by the inner surface of the side wall of the first bowl and the outer surface of the side wall of the second feeding bowl. When the olfactive product evaporates from the odour chamber where it is contained, the olfactive aromas exit the odour chamber and then circulates from the proximal end of the vent to the distal end of the vent and finally exits the vent in the environment, close to the opening of the second feeding bowl, at the outer side thereof.

In some embodiments, the first bowl, or alternatively the separating module, includes heating means aimed at heating the olfactive product.

As used herein, the expression "heating means" refers to a means allowing heating an olfactive product which is placed in the first bowl. The heating means may be adapted to heat an olfactive product comprised in the first bowl such that the olfactive product may be heated at a temperature ranging from 25° C. to 45° C., such as from 30° C. to 40° C. and in some embodiments at 37° C. The heating of an olfactive product comprised in the first bowl aims to maximize the release of aromas from the olfactory product. Thus, the heating means may be located in the base of the first bowl or alternatively in the separating module. A kind of heating means according to the present disclosure may be a heating resistor, a radiator, hot water, candle or any other source of heat.

As previously described, the present food bowl assembly of the kit includes a vent arranged to allow odours of an olfactive product, when an olfactive product is contained in the first bowl, and preferentially in the separating module, to exit the separating module or the odour chamber and then exit the food bowl assembly, i.e. through the distal end of the vent without any contact with the food composition within the second feeding bowl.

As used herein, the term "vent" generally refers to any form of cavity, gap, channel, passage or combination of more than one of these, though which gas and in particular odour, may flow. Particularly, the vent consists of the combination between the cavity, the channel and the gap.

The vent preferably provides fluid communication between an odour chamber which is the cavity of the separating module, and an odour exit defined by a space between the first bowl and the side walls of the second feeding bowl, to enable odours to travel therethrough.

Furthermore, the vent is arranged so that odours of the olfactive product do not pass through food composition, i.e. low palatability food composition, but rather are directed around the outside of the feeding bowl. As a result, they do not become intimately mixed with aromas or other components from the food composition itself. Consequently, when using a food bowl assembly according to the present disclosure, the aromas or odours generated by the olfactive product and then circulating along the vent, because these do not enter into contact with the food composition contained in the second feeding bowl, cannot cause physical or chemical alteration to the said food composition.

In some embodiments, the vent consists of the combination between a cavity, one or more channel(s) and a gap.

In particular, the food bowl assembly of the kit comprises a gap arranged between the first bowl and the side walls of the second feeding bowl which gap extents around the entire rim of the second feeding bowl.

In some embodiments, the first bowl and the second feeding bowl are of similar shape. By "similar shape", it is intended that one shape can become the other shape after a resize, a flip, a slide or a turn. Same shapes are included within the expression similar shapes. In particular, the cross-sectional area of the second feeding bowl is smaller than that of the first bowl, so that it may sit concentrically within the first bowl, leaving a gap between the outer surface of the wall of the first bowl and the inner surface of the wall of the second feeding bowl.

In some embodiments, the gap is constant width there between.

The size of the gap will be enough to allow odour to emanate freely from the vent. However, it is suitably not too wide, as this may allow a mammal such as a cat, to try to disturb the food bowl assembly, by putting claws, nose or paws into the vent. Furthermore, too large a gap between the first bowl and the second feeding bowl may allow relative movement of the second feeding bowl within the first bowl during use, which may disturb the mammal. Suitably the gap between the second feeding bowl and the first bowl in the food bowl assembly will be from 1-12 millimetre (mm), for example, from 2-10 mm such as about 7 mm.

The first bowl and second feeding bowl may be ofany convenient cross-sectional shape. Thus, for example, they may be round, square or rectangular in cross-section.

According to an embodiment of the disclosure, without limitation, round shape is preferred, such as round or oval shape, for the second feeding bowl. According to another embodiment of the disclosure, without limitation, round shape is preferred, such as round or oval shape, for the second feeding bowl and also for the first bowl.

In another embodiment, more particularly for cat, the second feeding bowl according to the disclosure may be shallow and/or not very deep. Cats generally use their whiskers to sense any dangers around them, so a cat unsure of its surroundings or a nervous cat would prefer for their whiskers to be free while eating and not touch the side of the bowl. It has been suggested that deep bowls can stress out some cats, due to the fact that they feel a constant stimulus from the sides of the bowl brushing against their whiskers. This is sometimes referred to as "whisker fatigue", or "whisker stress". In another alternative, the second feeding bowl may be wide and flat.

In another alternative, both second feeding bowl and first bowl are shallow and/or not very deep.

In another embodiment, only the second feeding bowl is shallow and/or not very deep whereas the first bowl is designed in a way to result in an elevation of the second feeding bowl. Some mammals benefit from using an elevated feeder. Raising the food can help improve the digestion, and many elderly mammals can benefit from having their food raised off the floor. It makes it easier for them to eat and helps them get the best from their food.

According to a further embodiment, the height of the first bowl and the height of the second feeding bowl are at the same level, particularly when it is in position in the food bowl assembly of the disclosure, taking account the presence of the odour chamber. Thus, in some embodiments of a food bowl assembly according to the present disclosure, the upper end of the wall of the first bowl and the upper end side wall of the second feeding bowl are substantially at the same level according to a horizontal plane. In some of these embodiments, the upper end of the wall of the second feeding bowl may be lower than the upper end of the wall of the first bow, according to a horizontal plane. These embodiments ensure that the first bowl does not act as a barrier to discourage the mammal from feeding from the second feeding bowl and also the odour emanating from the gap is concentrated in the area of the mammal's head and not unduly dissipated.

In some embodiments, the separating module is configured to fit between the solid base of the second feeding bowl and the base of the first bowl, especially between the bottom outer surface of the wall of the second feeding bowl and the bottom inner surface of the first bowl.

The separating module may have side walls, outer and inner surfaces defining an odour chamber or cavity, which may surround an olfactive product, wherein at least one opening is provided therein to permit egress of odour from the cavity to the vent. This embodiment is particularly effective as the opening has the effect of concentrating the upwardly mobile odours and directing them into the vent.

The vent may include one or more channels extending between the opening of the cavity and the gap between the first bowl and the side walls of the second feeding bowl.

In particular, the one or more channels may be provided in the outer surface of the separating module, so that the separating module and the outer surface of the bottom of the second feeding bowl together define the one or more channels, each channel may lead to different points around the edge of the separating module.

In some embodiments, the one or more channels provide odour communication between the odour chamber and the gap.

The channels may thus be arranged to allow even distribution of odours from the cavity of the separating module to the vent, around substantially the entire circumference of the vent.

Accordingly, the separating module includes:
(a) an odour chamber or cavity containing the olfactive product;

(b) an outer surface;
(c) at least one edge;
(d) an opening which is located in the outer surface of the separating module; and
(e) one or more channels which is in the outer surface of the separating module from the opening to the edge.

In particular, the separating module further includes:
(f) at least one supporting leg which raises the opening and channels above the floor of the first bowl; and
(g) at least one supporting region which defines the top of the cavity and comprises the opening and the one or more channels.

In embodiments in which the vent includes one or more channels extending between the odour cavity and the gap, the one or more channels may extend from such opening(s) in or between such supporting region.

Suitably, a plurality of channels is provided in the outer surface of the separating module, each channel being arranged to direct to different points around the edge of the separating module. In particular, from 2-12 channels are provided in the outer surface of the separating module, for example about 8 channels. These are suitably arranged to allow even distribution of odours into the gap around the entire circumference of the second feeding bowl and first bowl.

The food bowl assembly of the disclosure may be modular in nature and so the second feeding bowl, the first bowl and the separating module may be assembled for use in situ and readily disassembled for washing after use.

In other embodiments one or more of the second feeding bowl, first bowl and separating module may be formed integrally with one another so that they provide a unitary part. For example, the second feeding bowl and separating module may be formed integrally with one another.

In some embodiments, the separating module further includes a bottom wall so as to provide a discrete holder for the olfactive product. In this embodiment, the olfactive product is positioned in the separating module, for example, by adding it through the opening in the outer surface, before the separating module is placed in the first bowl. The second feeding bowl is then positioned on the separating module subsequently, so as to cover the outer surface of the separating module and thus close the opening located at the outer surface of the separating module, ensuring that odour is directed along the channel(s).

In distinct embodiments, the separating module has no bottom wall, or has an opening in its bottom wall. According to these embodiments, the olfactive product is placed on a central region of the base of the first bowl and the separating module placed over it, so that the olfactive product is then enclosed within the cavity of the separating module. In this embodiment, the second feeding bowl is suitably fixed in position on top of the separating module, for example using fixing means such as tacks, nails, screws or adhesives.

Alternatively, the separating module may be formed in an integral manner with the second feeding bowl.

The opening in the outer surface of the separating module should be of a suitable size to allow for odours to escape therethrough. Where the separating module also forms a discrete container as described above, it should be sufficiently large to allow the odorant substance to be introduced into the separating module. However, it should be small enough to ensure that it is completely covered and effectively closed by the addition of the second feeding bowl onto the surface thereof. Typically, the opening will be from 1-10 centimetres (cm), in particular from 2-6 cm across.

The or each channel is suitably moulded into the outer surface of the separating module and will be deep enough to allow gases and particularly odours to travel along the channels into the gap between the second feeding bowl and the first bowl. The depth will be constrained by the thickness of the outer surface of the separating module. Typically, each channel will be from 0.5-1.5 cm wide, for example about 1 cm wide, and up to 1 cm deep, for example up to 0.5 cm deep.

Although only one opening may be needed in the outer surface of the separating module, additional openings can be provided if required, in which case, channels may extend from each of these to the edge of the separating module. In this case however, the arrangement of the openings should be such that they are all effectively covered by the second feeding bowl when it is in position on the separating module in the food bowl assembly of the disclosure.

The size of the bowls will vary depending upon the type of mammal being assessed. For domestic cats for instance the bowls may be from 8-20 cm across, while for dogs, larger bowls for example, from 10-30 cm across may be more suitable. In other embodiment, the food bowl assembly may have any shape suitable for any specific mammal.

As used herein, the term "bowls" encompasses the first bowl and the second feeding bowl.

The first bowl, second feeding bowl and, where present, the separating module may be made of any suitable rigid material. According to the disclosure, the first bowl and/or the second feeding bowl and/or the separating module when present, can be made without limitation of plastic, metals, glass, ceramic or any other equivalents. This includes plastics such as polyethylene, polypropylene, polyoxymethylene or co-polymers including acetals, for instance Natural Acetal or metals or metal alloys such as stainless steel. However, the material should not react with food composition, or with any olfactive product or odours which it is likely to come into contact with and so it should be relatively chemically inert. Furthermore, it should be easy to clean, as well as non-toxic and so safe in the event that it is chewed by a mammal, such as a baby, a cat or a dog, using it. In some embodiments, the first bowl and/or the second feeding bowl and/or the separating module when present, can be made of stainless steel for sanitary and germ-resistance reasons as bacteria cannot enter hard, non-porous surface. Such stainless bowls are resistant, easy to clean and are chemically inert regarding any contact with food as there is no release nor absorption. According to another embodiment, the first bowl and/or the second feeding bowl and/or the separating module when present, can be made into ceramic or glass as they are also chemically inert regarding any contact with food or aromatic substances and they have a good behaviour regarding inertia and chemical resistance.

It must be understood that both bowls can be made of different materials. As a non-limitative example, the first bowl can be made into plastic for cost consideration or in ceramic for aesthetic/design consideration whereas the second feeding bowl can be made into stainless steel for sanitary and/or resistance considerations.

Furthermore, the weight of the food bowl assembly and in particular the size to weight ratio should be such that it cannot be easily overturned or disrupted by the mammal. Typically for cats, the overall weight of the food bowl assembly should be in the range of 200 grams (g)-2 kilograms (kg), such as from 200 g-300 g with a size to weight ratio in the range from 1:25 to 1:2.5. For a dog, the overall weight of the food bowl assembly is suitably in the range of 1-5 kg with a size to weight ratio in the range from 1:20 to 1:4.

As used herein, the term "mammal" or "mammals" comprises a human or an animal.

As used herein, the term "animal" or "animals" designates a ruminant, poultry, swine, horse, mouse, rat, rabbit, guinea pig, hamster, cow, cat or dog, preferably a pet. In a preferred embodiment, the animal according to the disclosure is a feline or a canine such as a dog, a cat, a puppy or a kitten.

Figure 2:
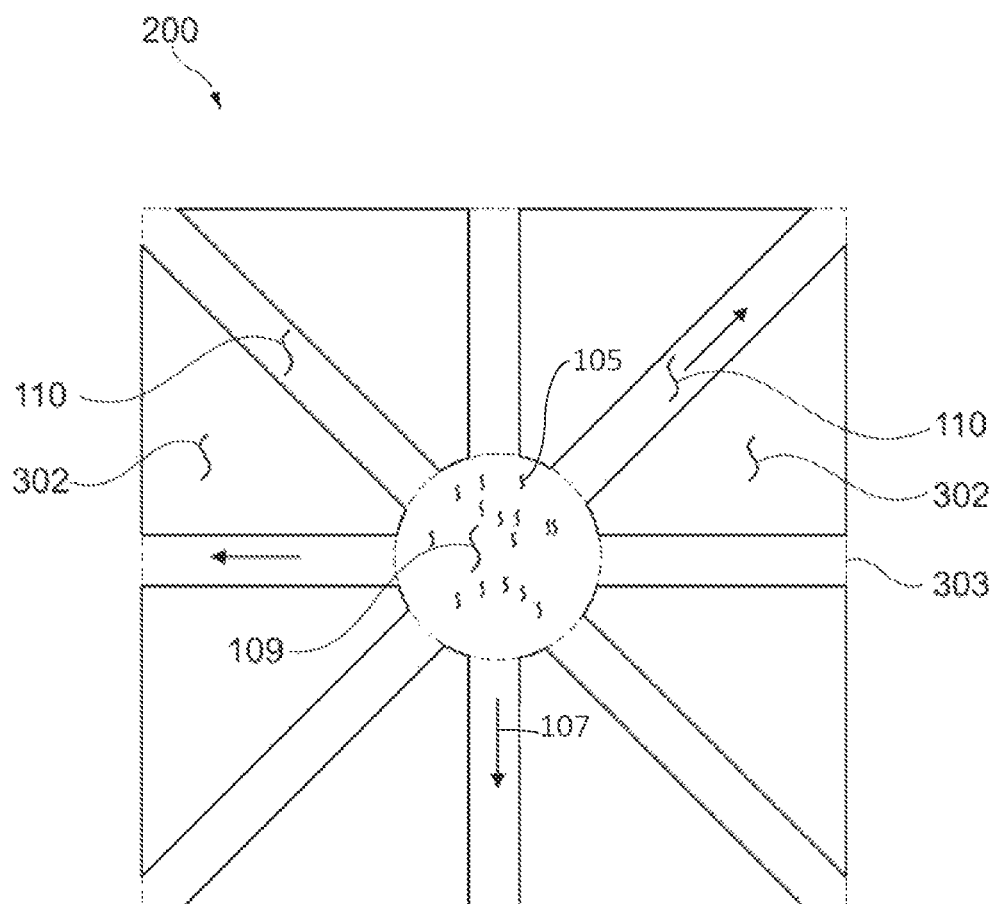
FIG. 2 illustrates a top view of a separation module used in the food bowl assembly of FIG. 1.
Figure 3:
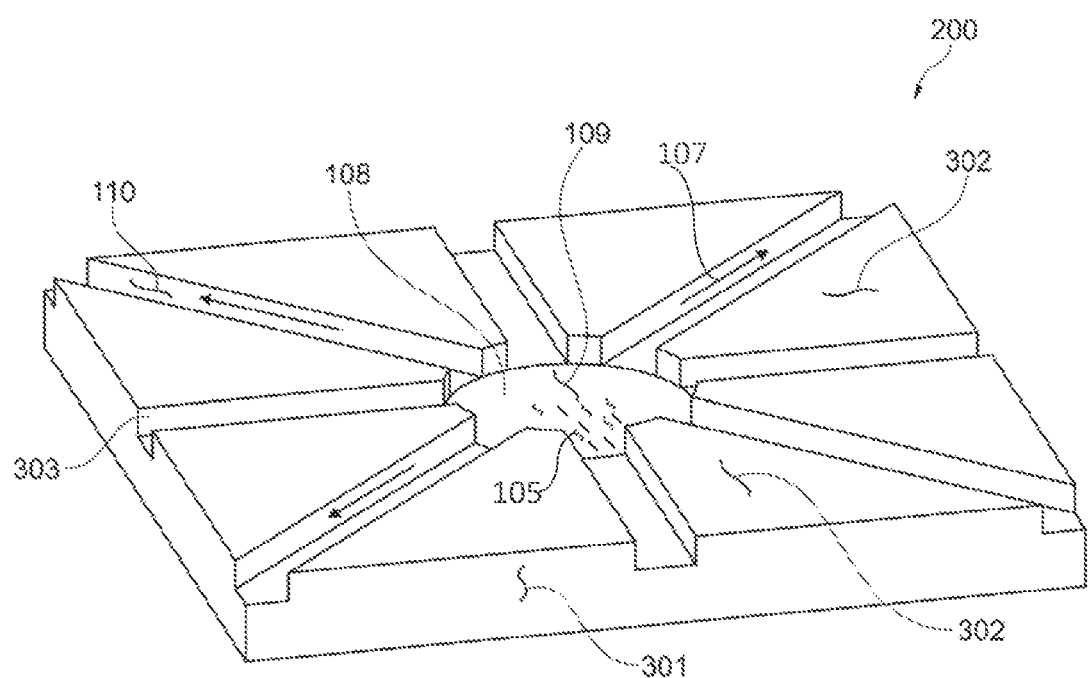
FIG. 3 illustrates a perspective view of the separation module of FIG. 2.

One aspect of a food bowl assembly (100) of the kit according to the present disclosure is illustrated in FIG. 1 so as more specifically the separating module (200) in FIGS. 2 and 3.

The kit of the disclosure includes a food bowl assembly illustrated in FIG. 1 including a first bowl (101) which is able to accommodate a second feeding bowl (102). The first bowl (101) includes an inner surface (1011), an outer surface (1012) and an upper end (1013). The second feeding bowl (102) includes a solid base (103) which consists of the bottom thereof and aside wall, an inner surface (1021), an outer surface (1022) and an upper end (1023). The second feeding bowl (102) is positioned on top of a separating module (200) which has an inner surface (2001), an outer surface (2002) and defines an odour chamber or cavity (108) that can contain an olfactive product (105). In the kit according to the present disclosure, the olfactive product (105) is presented separately from the food bowl assembly (100). Typically, in a kit according to the present disclosure, the olfactive product (105) is contained in an adapted container, such as in a can, a pouch, a flask or in a tube or any similar container known by the person skilled in the art. Such container can be steamed or sealed and also sterilized. The said olfactive product (105) is the second part of the kit of the present disclosure.

An opening (109) is provided in the outer surface of the separating module (2002). In addition, a plurality of channels (110) are provided in the outer surface of the separating module (2002) which radiate outwards to the edges of the separating module (303) (FIG. 3). The channels (110) are separated by supporting regions (302). Further, the channels (110) include regions of reduced thickness as compared to the supporting regions (302).

The second feeding bowl (102) is positioned on the outer surface of the separating module (2002) so that the outer surface of the second feeding bowl (1022) covers the opening of the separating module (109). In this position, there is a gap (106) between the side walls of the second feeding bowl (102) and the side walls of the first bowl (101), precisely between the outer surface of the second feeding bowl (1022) and the inner surface of the first bowl (1011). The upper end of the wall of the first bowl (1013) and the upper end of the wall of the second feeding bowl (1023) are substantially at the same level according to a horizontal plane. The channels (110) each extend from the opening of the separating module (109) to the gap (106) to provide fluid communication between the cavity (108) and the gap (106).

The combination of the opening (109), the channels (110) and the gap (106) provides a vent (113), allowing odours of olfactive product (107) formed within the cavity (108) to emanate from around the outer edges of the food bowl assembly. Thus, odours of olfactive product (107) can diffuse from the cavity through the vent (113) to the surface of the food bowl assembly (100) and blends in with odours of the food composition (112), if there is. Illustratively, odours of olfactive product (107) travel from the cavity (108) into the opening (109), and from there into each of the channels (110) to the edges of the separating module (303) and up by the gap (106) to the upper end of the food bowl assembly (1013+1023) to be inhaled by the animal.

In the illustrated embodiments the separating module (200) has supporting legs (301) that raise the opening (109) and channels (110) above the floor of the first bowl (101). However, in other embodiments the separating module (200) may have no supporting legs, but may instead be supported directly on the supporting regions (302). In such embodiments the cavity (108) is defined by the opening (109).

In an illustrative embodiment of the kit, a user, for example the owner's animal, takes the food bowl assembly (100) and an olfactive product (105). The user would then place the separating module (200) within the first bowl (101). The user places in the cavity (108) a desired olfactive product, such as, for example methional or 2,5-dimethylpyrazine. The solid base (103) of the second feeding bowl (102) may then be engaged or attached to the outer surface of the separating module (2002) so they are joined together, with the separating module positioned between the base of the first bowl (104) and the solid base of the second feeding bowl (103). The desired animal food composition (111), i.e. a low palatability food composition, then may be placed within the second feeding bowl (102) for consumption by an animal, such as dog or cat. After use, the food bowl assembly (100) may be disassembled for washing and reuse. In another embodiment, it could be developed as a disposable bowl.

According to the inventors, one of a significant advantage of the food bowl assembly (100) of the present disclosure is that the olfactive product (105) is not in contact with the food composition (111) within the second feeding bowl (102) since the separating module has no perforations in its outer surface. In this way, the user may use a wet or a semi-moist food composition (111) without contaminating the aroma-producing of the olfactive product (105).

Second Part: Container Comprising Olfactive Product(s)

The kit of the present disclosure includes a second part comprising an olfactive product. In an embodiment, the kit of the present disclosure includes a second part including a container comprising at least one olfactive product. In an embodiment, the kit of the present disclosure includes a second part which consists of a container comprising at least one olfactive product.

The term "olfactive product" means any compound, composition, formulation, or other material useful for enhancing the attractiveness and palatability of a comestible composition such as a food composition, supplement, medicament, or the like. Thus, such olfactive product may contribute to initial appeal, continued consumption, or repeated presentation aspects of palatability, or any combination thereof. Such product can include liquid and/or powder palatants. Olfactive products can include fats and oils (e.g. poultry fat, tallow), flavors, chemical molecules, aromas, extracts (e.g. yeast), digests, hydrolysates (e.g. poultry liver), protein ingredient (e.g., poultry meal), carbohydrate food (e.g. rice flour), powders and the like. For example, the olfactive product can include fragrances such as food fragrances, odour masking agents and mixtures thereof, such as flavor compound as well as precursors for the above. The olfactive product does not consist of a food product or of a nutritional product.

In an embodiment, the "olfactive product" refers to an odour product presented in a liquid, jelly, foam, oily, gel, solid form, aromatic cocktail, patch, powder, alcohol, fat, tabs or any other suitable presentation. In some embodiments, the olfactive product is in a liquid form such as in the form of a solution or of a suspension. In some other embodiments, the olfactive product may consist of a solid form, such as in a powder form.

According to an embodiment of the disclosure, the olfactive product can be, without limitation, a liquid, a paste, a powder, an encapsulated substance, a scratch and sniff pad, or any other equivalents.

The kit of the present disclosure includes a second part comprising an olfactive product which can be selected from: acetic acid; propanoic acid; butyric acid; 3-methylbutyric acid; hexanoic acid; citric acid; tartaric acid; fumaric acid; lactic acid; hexamic acid; butyl hexanoate; heptyl formate; ethyl decanoate; ethyl caprylate; acetaldehyde; 3-methyl butanal; pentanal; heptanal; octanal; benzaldehyde; anisole; pentanol; 2-ethyl hexanol; 2,3-butanediol; thymol; carvacrol; 1,5-octadien-3-ol; acetone; 2,3-pentanedione; 2-piperidione; 2-heptanone; 1,5-octadien-3-one; ethyl vanillin; vanillin; pyrazine; methyl pyrazine; methyl pyrazine; 2,5-dimethylpyrazine; 2,6-dimethylpyrazine; 2-methyl-6-(methio)-pyrazine; 2-ethyl-3,5-dimethylpyrazine; 2-ethyl-5-methyl pyrazine; 2-ethyl-6-methylpyrazine; ethyl pyrazine; 2-pentyl furan; 2-ethylfuran; 2,5-dimethylfuran; 2-[(methyldithio)methyl]-furan; 2-(2-propenyl)-furan; 2-furanmethanol; 4-hydroxy-3(2H)-furanone and alkyl-substituted 4-hydroxy-3(2H)-furanone compounds; indole; furfural; sulphurol; 2-acetylpyridine; 2,3-dihydrothiophene; 2-methyl thiophene; 3-methyl thiophene; 2,5-dimethyl thiophene; dihydro-2-methyl-3(2H)-thiophene; benzo[b]thiophene-4-ol; 5-methyl-2-thiophenecarboxaldehyde; methyl ethyl disulfide; dimethyl trisulfide; methyl-2-methyl-3-furyl disulfide; 2-methyl-1-ethyl pyrrolidine; 2-acetylthiazole; 4-methylthiazole; 2-ethylthiazole; theanine; glutamine; tea; and a mixture thereof.

In an embodiment of the disclosure, the kit includes a second part consisting of a container comprising at least one olfactive product selected from fats, oils, flavours, flagrances, chemical molecules, aromas, extracts, digest, hydrolysates, protein ingredient, carbohydrate food or powder.

In another embodiment of the disclosure, the kit includes a second part consisting of a container comprising at least one chemical molecule selected from acetic acid; propanoic acid; butyric acid; 3-methylbutyric acid; hexanoic acid; citric acid; tartaric acid; fumaric acid; lactic acid; hexamic acid; butyl hexanoate; heptyl formate; ethyl decanoate; ethyl caprylate; acetaldehyde; 3-methyl butanal; pentanal; heptanal; octanal; benzaldehyde; anisole; pentanol; 2-ethyl hexanol; 2,3-butanediol; thymol; carvacrol; 1,5-octadien-3-ol; acetone; 2,3-pentanedione; 2-piperidione; 2-heptanone; 1,5-octadien-3-one; ethyl vanillin; vanillin; pyrazine; methyl pyrazine; methyl pyrazine; 2,5-dimethylpyrazine; 2,6-dimethylpyrazine; 2-methyl-6-(methio)-pyrazine; 2-ethyl-3,5-dimethylpyrazine; 2-ethyl-5-methyl pyrazine; 2-ethyl-6-methylpyrazine; ethyl pyrazine; 2-pentyl furan; 2-ethylfuran; 2,5-dimethylfuran; 2-[(methyldithio)methyl]-furan; 2-(2-propenyl)-furan; 2-furanmethanol; 4-hydroxy-3(2H)-furanone and alkyl-substituted 4-hydroxy-3(2H)-furanone compounds; indole; furfural; sulphurol; 2-acetylpyridine; 2,3-dihydrothiophene; 2-methyl thiophene; 3-methyl thiophene; 2,5-dimethyl thiophene; dihydro-2-methyl-3(2H)-thiophene; benzo[b]thiophene-4-ol; 5-methyl-2-thiophenecarboxaldehyde; methyl ethyl disulfide; dimethyl trisulfide; methyl-2-methyl-3-furyl disulfide; 2-methyl-1-ethyl pyrrolidine; 2-acetylthiazole; 4-methylthiazole; 2-ethylthiazole; theanine; glutamine; tea; and a mixture thereof.

In embodiments, an olfactive product suitable for the present invention may have an odour or smell of or resembling one or more of meat, poultry, fish, marine organism, mollusc, crustacean, cheese, bacon, butter, cream, game, gravy, rabbit, turkey, fowl, rodent, mouse, bird, plant, yeast, seafood and/or extracts of any one or more of these.

In embodiments, an olfactive product suitable for a kit of the invention may include an olfactive compound, as previously defined, formulated with at least one formulating ingredient to confer an appropriate consistence; liquid, solid, powder-like or pasty-like. Appropriate formulating ingredients may be water, oil, flour, starch, or carbohydrate such as maltodextrin.

An olfactive product may include at least one olfactive compound as previously defined.

In embodiments, an olfactive product includes as sole olfactive compound a compound selected in the above-define list, or a mixture thereof.

In embodiments, an olfactive product includes one olfactive compound selected in the above-defined list, including mixtures thereof, and at least one formulating ingredient.

Within the disclosure, the term "alkyl" refers to $C_1$-$C_6$, preferably $C_1$-$C_4$, more preferably $C_1$-$C_3$, and more preferably $C_1$-$C_2$, linear or branched, saturated alkyl moieties.

In embodiments, the alkyl-substituted 4-hydroxy-3(2H)-furanone compound may be selected from: 5-methyl-4-hydroxy-3(2H)-furanone; 2,5-dimethyl-4-hydroxy-3(2H)-furanone; 5-methyl-2-ethyl-4-hydroxy-3(2H)-furanone; 5-ethyl-2-methyl-4-hydroxy-3(2H)-furanone; and 2,5-diethyl-4-hydroxy-3(2H)-furanone, and a mixture thereof.

In other embodiments, an olfactive product suitable for the present invention may be formulated as described in WO 2010/018365A1, the content of which being incorporated by reference. In another embodiment, olfactive product can be selected from any commercially available products, such as, without limitation, palatability solutions named D'TECH PALATABILITY ENHANCER (for dog) or C'SENS PALATABILITY ENHANCER (for cat).

In another embodiment, olfactive product may be selected from 2.5 dimethylpyrazine, 4-hydroxy-3-methoxy-benzaldehyde (=vanillin) and methional.

As other possible olfactive product useful for the disclosure, one may mention the commercially available beef flavouring OF9137, chicken flavouring (OF6320) and mackerel flavouring (OF2257) available from Aromco Ltd, Bell Farm Industrial Park, Nuthampstead, Hertfordshire, UK. They are found to provide excellent attractant properties when used in amounts in the range 0.25% to 3% by weight of the total weight of the olfactive product.

In other embodiments, an olfactive product suitable for the present disclosure may be one of the exemplary compositions of the examples 1 to 4 as described in WO 2010/018365A1, the content of which being incorporated by reference.

The olfactive compounds: hexanoic acid; acetaldehyde; 2-heptanone; butyl hexanoate; heptyl formate; methyl pyrazine; 2,5-dimethyl pyrazine; pentanal; ethyl decanoate; heptanal; octanal; pentanol; acetone; ethyl caprylate; 3-methyl butanal; anisole; 2-ethyl hexanol; 2-pentyl furan; 2,3-butanediol; benzaldehyde; ethyl vanillin; and vanillin are described in Maoshen et al. 2016 (Optimization of key aroma compounds for dog food attractant in *Animal Feed Science and Technology*), the entire contents of which is herein incorporated by reference.

The olfactive compounds: butyric acid; 3-methylbutyric acid; 2-piperidione; 2,3-pentanedione; 2-ethyl-3,5-dimethylpyrazine; furfural; sulphurol; and indole are described in WO 2010/138372, the entire contents of which is herein incorporated by reference.

The olfactive compounds: 2-acetylpyridine; 2-acetylthiazole and 4-hydroxy-5-methyl-3(2H)-furanone are described in Hautala J. *Improving the Palatability of Minitablets for Feline Medication*. Helsinki: University of Helsinki, 2017. 72 p. (Dissertationes Scholae Doctoralis Ad Sanitatem Investigandam Universitatis Helsinkiensis; 2017/23).

The olfactive compounds: thymol (also named "5-methyl-2-isopropylphenol") and carvacrol (also named "2-methyl-5-isopropylphenol") are described in US2005/0112259, the entire contents of which are herein incorporated by reference.

The olfactive compounds: 2-ethyl furan; 2,3-dihydrothiophene; methyl pyrazine; 2-furanmethanol; ethyl pyrazine; 2-ethyl-5-methyl pyrazine; 2-methyl-6-(methio)-pyrazine; 2,5-dimethyl furan; 2-methyl thiophene; methyl ethyl disulfide; 2,5-dimethylpyrazine; 2-methyl-1-ethyl pyrrolidine; 2-ethyl-6-methyl pyrazine; 2-[(methyldithio)methyl]-furan; pyrazine; 3-methyl thiophene; 2-(2-propenyl)-furan; 2,6-dimethylpyrazine; dimethyl trisulfide (DMTS); 5-methyl-2-thiophenecarboxaldehyde; benzo[b]thiophene-4-ol; propanoic acid; 4-methylthiazole; 2,5-dimethyl thiophene; ethylthiazone; dihydro-2-methyl-3(2H)-thiophene; and methyl-2-methyl-3-furyl disulfide are described in U.S. Pat. No. 6,660,319 B1, the entire contents of which are herein incorporated by reference.

The olfactive compounds: theanine; glutamine; tea; 1,5 octadien-3 one; and 1,5-octadien-3-ol are described in US 2008/0299286 A1, the entire contents of which are herein incorporated by reference.

The olfactive compounds: citric acid; tartaric acid; fumaric acid; lactic acid; acetic acid; and hexamic acid are described in U.S. Pat. No. 3,679,429, the entire contents of which are herein incorporated by reference.

The olfactive compounds: alkyl-substituted 4-hydroxy-3(2H)-furanone compound and the selected compounds 5-methyl-4-hydroxy-3(2H)-furanone; 2,5-dimethyl-4-hydroxy-3(2H)-furanone; 5-methyl-2-ethyl-4-hydroxy-3(2H)-furanone; 5-ethyl-2-methyl-4-hydroxy-3(2H)-furanone; and 2,5-diethyl-4-hydroxy-3(2H)-furanone; are described in WO 2005/053421 A2, the entire contents of which are herein incorporated by reference.

The olfactive product includes as olfactive compound acetic acid. The olfactive product includes as olfactive compound propanoic acid. The olfactive product includes as olfactive compound butyric acid. The olfactive product includes as olfactive compound 3-methylbutyric acid. The olfactive product includes as olfactive compound hexanoic acid. The olfactive product includes as olfactive compound citric acid. The olfactive product includes as olfactive compound tartaric acid. The olfactive product includes as olfactive compound fumaric acid. The olfactive product includes as olfactive compound lactic acid. The olfactive product includes as olfactive compound hexamic acid. The olfactive product includes as olfactive compound butyl hexanoate. The olfactive product includes as olfactive compound heptyl formate. The olfactive product includes as olfactive compound ethyl decanoate. The olfactive product includes as olfactive compound ethyl caprylate. The olfactive product includes as olfactive compound acetaldehyde. The olfactive product includes as olfactive compound 3-methyl butanal. The olfactive product includes as olfactive compound pentanal. The olfactive product includes as olfactive compound heptanal. The olfactive product includes as olfactive compound octanal. The olfactive product includes as olfactive compound benzaldehyde. The olfactive product includes as olfactive compound anisole. The olfactive product includes as olfactive compound pentanol. The olfactive product includes as olfactive compound 2-ethyl hexanol. The olfactive product includes as olfactive compound 2,3-butanediol. The olfactive product includes as olfactive compound thymol. The olfactive product includes as olfactive compound carvacrol. The olfactive product includes as olfactive compound 1,5-octadien-3-ol. The olfactive product includes as olfactive compound acetone. The olfactive product includes as olfactive compound 2,3-pentanedione. The olfactive product includes as olfactive compound 2-piperidione. The olfactive product includes as olfactive compound 2-heptanone. The olfactive product includes as olfactive compound 1,5-octadien-3-one. The olfactive product includes as olfactive compound ethyl vanillin. The olfactive product includes as olfactive compound vanillin. The olfactive product includes as olfactive compound pyrazine. The olfactive product includes as olfactive compound methyl pyrazine. The olfactive product includes as olfactive compound 2,5-dimethylpyrazine. The olfactive product includes as olfactive compound 2,6-dimethylpyrazine. The olfactive product includes as olfactive compound 2-methyl-6-(methio)-pyrazine. The olfactive product includes as olfactive compound 2-ethyl-3,5-dimethylpyrazine. The olfactive product includes as olfactive compound 2-ethyl-5-methyl pyrazine. The olfactive product includes as olfactive compound 2-ethyl-6-methylpyrazine. The olfactive product includes as olfactive compound ethyl pyrazine. The olfactive product includes as olfactive compound 2-pentyl furan. The olfactive product includes as olfactive compound 2-ethylfuran. The olfactive product includes as olfactive compound 2,5-dimethylfuran. The olfactive product includes as olfactive compound 2-[(methyldithio)methyl]-furan. The olfactive product includes as olfactive compound 2-(2-propenyl)-furan. The olfactive product includes as olfactive compound 2-furanmethanol. The olfactive product includes as olfactive compound 4-hydroxy-3(2H)-furanone. The olfactive product includes as olfactive compound alkyl-substituted 4-hydroxy-3(2H)-furanone compounds. The olfactive product includes as olfactive compound indole. The olfactive product includes as olfactive compound furfural. The olfactive product includes as olfactive compound sulphurol. The olfactive product includes as olfactive compound 2-acetylpyridine. The olfactive product includes as olfactive compound 2,3-dihydrothiophene. The olfactive product includes as olfactive compound 2-methyl thiophene. The olfactive product includes as olfactive compound 3-methyl thiophene. The olfactive product includes as olfactive compound 2,5-dimethyl thiophene. The olfactive product includes as olfactive compound dihydro-2-methyl-3(2H)-thiophene. The olfactive product includes as olfactive compound benzo[b]thiophene-4-ol. The olfactive product includes as olfactive compound 5-methyl-2-thiophenecarboxaldehyde. The olfactive product includes as olfactive compound methyl ethyl disulfide. The olfactive product includes as olfactive compound dimethyl trisulfide. The olfactive product includes as olfactive compound methyl-2-methyl-3-furyl disulfide. The olfactive product includes as olfactive compound 2-methyl-1-ethyl pyrrolidine. The olfactive product includes as olfactive compound 2-acetylthiazole. The olfactive product includes as olfactive compound 4-methylthiazole. The olfactive product includes as olfactive compound 2-ethylthiazole. The olfactive product includes as olfactive compound theanine. The olfactive product includes as olfactive compound glutamine. The olfactive product includes as olfactive compound tea.

The olfactive product includes as olfactive compound a mixture of the above listed compounds, in particular a mixture comprising 2, 3, 4, 5, 6 or more, up to 11, 12, 13, 14 or 15 of any of the above listed compounds.

According to an embodiment, the kit according to the disclosure includes a container comprising one olfactive product specific to the mammal to be feed.

According to another embodiment, the kit according to the disclosure includes a container comprising several different olfactive products.

According to another embodiment, the kit according to the disclosure includes several containers comprising each a different olfactive product. By "different olfactive products", it must be understood a chemically different olfactive product or the same olfactive product but in a different concentration.

It can be useful to have different olfactive products in the kit, whether they are in the same container or in different containers, as it will allow the pet owner to i) select the best olfactive product for his pet and/or ii) adapt the olfactive product to a particular situation.

One may also mention that the skilled person in the art may find listings of active ingredients usable for olfactive products suitable for carrying out the present disclosure from databases provided by various professional pet food associations, such as AAFCO (Association of American feed control official) or the FEDIAF (The European Pet Food Industry).

According to another embodiment of the disclosure, the kit can further comprise a food composition. Accordingly, the present disclosure relates to a kit including:

(i) a first part having a food bowl assembly, said food bowl assembly including:
  (a) a first bowl as described;
  (b) a second feeding bowl as described and disposed within the first bowl and intended to receive food;
  (c) a separating module as described and arranged to fit between the second feeding bowl and the first bowl and intended to receive an olfactive product; and
  (d) a vent as described and arranged to allow odors from olfactive product within the separating module to exit the food bowl without passing through the food within the second feeding bowl;
(ii) a second part having a first container comprising at least one olfactive product; and
(iii) a third part consisting of a second container comprising a food composition.

As used herein, the term "food composition" or "diet" covers all of foodstuff, diet, food supplement, liquid or a material that may contain proteins, carbohydrates and/or crude fats. Food composition may also contain supplementary substances or additives, for example, minerals, vitamins and condiments (See Merriam-Webster's Collegiate Dictionary, 10th Edition, 1993). Such food composition may be nutritionally complete or not.

The food composition can be a dry, a wet or a semi-moist food composition a liquid, a gel, a gravy, a porridge, a soup, in particular a wet food composition.

As used herein, the term "wet food" or "wet food composition" generally refers to a food composition having a moisture content of 30% or more, or more than 40% by weight, relative to the total weight of the food composition. Preferably, the wet food composition has a moisture content lower than 90% by weight, relative to the total weight of the food composition. In general, it is the final product of a process comprising a final step of sterilization (instead of a drying step). In a preferred embodiment, the wet food consists of a chunk form, more particularly of chunks in gravy form. Preferably, the wet food consists of chunks and gravy, chunks in jelly, loaf, mousse, terrine, bites form. "Chunks and gravy" products include a preformed meat particle prepared by making a meat emulsion and by putting this meat emulsion through a muzzle under pressure and then cooked. A product, such as cooked meat, is diced into chunks, which are eventually mixed with a gravy or sauce. The two components are then filled into a container, usually a can or pouch, which is seamed or sealed and sterilized. As opposed to the ground loaf, chunk and gravy compositions have physically separated, discrete chunks (i.e. pieces of ground meat and grains) as prepared. These discrete particles are present in the gravy-type liquid in the final container. When serving, chunk and gravy products flow out of the can and can be easily mixed with other dry products. While the chunk and gravy products allow better integrity of the individual ingredients, the heterogeneous formulation of the chunk and gravy products are sometimes disfavored by consumers. Wet food compositions are generally packaged in can-like containers and are considered "wet" in appearance because of the moisture contained therein. Two types of wet compositions are generally known in the art. The first is known in the art as "ground loaf." Loaf products are typically prepared by contacting a mixture of components under heat to produce an essentially homogeneous, intracellular honeycomb-type mass or "ground loaf." The ground loaf mass is then packaged into a cylindrical container, such as a can. Upon packing, ground loaf assumes the shape of the container such that the ground loaf must be cut when serving to a companion animal. The wet food composition is preferably packaged. In this way, the consumer is able to identify, from the packaging, the ingredients in the food product and confirm that it is suitable for the particular pet in question. The packaging may be metal, plastic, paper or card.

As used herein, the term "dry food" or "dry food composition" generally refers to a food or composition having a moisture content of less than 12% by weight, relative to the total weight of the food composition, and commonly even less than 7% by weight, relative to the total weight of the food composition. In preferred embodiments, dry food according to the present disclosure has a moisture content of at most 12% by weight. In some embodiments, the said dry food has a moisture content of 7% or less, such as 5% by weight. In preferred embodiments, the dry food has a moisture content of more than 3% by weight, relative to the total weight of the food composition. For instance, the examples provided herein illustrate a dry food having a moisture content of 9.5% by weight, relative to the total weight of the food composition. In a preferred embodiment the dry food consists of a kibble. Preferentially, for example and without limitation, kibbles include particulates; pellets; pieces of pet food, dehydrated meat, meat analog, vegetables, and combinations thereof; and pet snacks, such as meat or vegetable jerky, rawhide, and biscuits. The dry food composition may be manufactured by mixing together ingredients and kneading in order to make consistent dough that can be cooked. In general, it can be the final product of a process comprising an extrusion step followed by a drying step.

The process of creating a dry food is usually done by baking and/or extruding. The dough is typically fed into a machine called an expander and/or extruder, which uses pressurized steam or hot water to cook the ingredients.

While inside the extruder, the dough is under extreme pressure and high temperatures. The dough is then pushed through a die (specifically sized and shaped hole) and then cut off using a knife. The puffed dough pieces are made into kibble by passing it through a dryer so that moisture is dropped down to a defined target ensuring stability of the food until consumption. The kibble can then be sprayed with fats, oils, minerals, vitamins, the natural extracts cocktail and optionally sealed into packages. The dry food composition is preferably packaged. In this way, the consumer is able to identify, from the packaging, the ingredients in the food product and confirm that it is suitable for the pet, i.e. dog, in question. The packaging may be metal, plastic, paper or card.

As used herein, the term "semi-moist food" or "semi-moist food composition" generally refers to a food composition with an intermediate moisture content of about 12% to about 30% in weight, relative to the total weight of the food composition. Hence, such semi-moist food composition is generally the final product of a process allowing a moisture content value that is intermediate between a dry food and a wet food. In some embodiments, the said process may comprise a step of adding a humectant agent. In some embodiments, the said process comprises an extrusion step and a subsequent treatment step with Super-Heated Steam (SHS). In some embodiments, the semi-moist food according to the present disclosure containing more than 12% and at most 30% moisture by weight, relative to the total weight of the food composition. Illustratively, a semi-moist food composition has 11% to 25% moisture by weight, relative to the total weight of the food composition, and/or a water activity of 0.64 to 0.75, preferably both.

The second container can be selected, as non-limitative example, from a can, a pouch, a tube or a bag.

Methods and Therapeutic Applications

A further aspect of the present disclosure relates to a method for use in treating and/or preventing food aversion in a mammal, such as a cat or a dog.

In particular, the present disclosure relates to a method for stimulating appetite of a mammal, said method including the steps of:
 (i) providing a kit as described throughout the present disclosure,
 (ii) placing the olfactive product of the second part in the separating module (within the odour chamber if present) of the food bowl assembly,
 (iii) placing a food composition in the second feeding bowl so as to provide an operational food bowl assembly, and
 (iv) allowing a mammal to access the operational food bowl assembly obtained at step (iii).

In another embodiment, of the disclosure, the mammal for which it is intended to stimulate the appetite is a mammal suffering from a food aversion disease or a disorder.

In another embodiment, the present disclosure relates to a method for treating and/or preventing food aversion in a mammal, said method including the steps of:
 (i) providing a food bowl assembly as described throughout the present disclosure,
 (ii) placing the olfactive product of the second part in the separating module (within the odour chamber if present) of the food bowl assembly,
 (iii) placing a food composition in the second feeding bowl so as to provide an operational food bowl assembly, and
 (iv) allowing a mammal to access the operational food bowl assembly obtained at step (iii). As used herein, a "food aversion" refers to an eating disorder causing ill health and undesirable effects on the animal such as renal troubles, an under nutrition, a lack of energy, or an ineffective therapeutic treatment as it is related to food composition intake. Food aversion may occur when a mammal associates the taste of a food composition with symptoms caused by a toxic, spoiled, or poisonous substance. Generally, food aversion is developed after ingestion of food composition that causes nausea, sickness or vomiting.

A further aspect of the present disclosure relates to a method for use in treating and/or preventing the loss of appetite in a mammal, such as a cat or a dog, suffering from a disease or a disorder.

In particular, the present disclosure relates to a method for treating and/or preventing the loss of appetite in a mammal suffering from a disease or a disorder, said method including the steps of:
 (i) providing a kit as described throughout the present disclosure,
 (ii) placing the olfactive product of the second part in the separating module (within the odour chamber if present) of the food bowl assembly,
 (iii) placing a food composition in the second feeding bowl so as to provide an operational food bowl assembly, and
 (iv) allowing a mammal to access the operational food bowl assembly obtained at step (iii).

Further, refusal of low palatability diet may occur when a mammal dislikes the smell of the food composition or whether the food composition has no smell, i.e. low palatability food composition, including an unpalatable food composition, e.g. a hypoallergenic diet or an anallergic diet.

In one embodiment, a food composition may be a low palatability food composition. Accordingly, such low palatability food composition, including an unpalatable food composition, for example, an anallergic and/or a hypoallergenic food.

As used herein, the term "low palatability" relates to a product that does not provide a pleasant sensation when consumed or that is not attractive in terms of smell, including an unpalatable food composition, e.g. a hypoallergenic diet or an anallergic diet.

As used herein, the term "hypoallergenic diet" or "anallergic food" refers to a food composition compatible with an allergen-restricted diet. These hypoallergenic diets can be unpalatable to or inappropriate for certain animals, causing the animal to develop an aversion to this food composition. A hypoallergenic diet encompasses a therapeutic food composition.

Illustratively, a therapeutic diet or a dietetic diet could be a food composition for the good health of urinary system, e.g. Renal Select Feline or Instinctive, produced by Royal Canin®.

In a particular embodiment, a food composition includes a dry, a wet or a semi-moist food composition a liquid, a gel, a gravy, a porridge, a soup, in particular a wet food composition.

Accordingly, in some embodiments, the kit of the present disclosure allows to use wet food composition, i.e. low palatability wet food composition.

In another embodiment, a food composition consists of a food for the good health of urinary system.

Therefore, the present disclosure relates to a method of making a mammal desire to eat a food composition, again that it did not want to eat. In particular, this method is useful for a mammal who does not want to eat a food composition which is unpalatable.

A further aspect of the present disclosure relates to a kit, as previously described for use in a method for treating and/or preventing a disease or disorder in a mammal.

A further aspect of the present disclosure relates to a kit, as previously described for use in a method for treating and/or preventing a disease or disorder caused by food aversion in a mammal.

Particularly, the present disclosure relates to a kit including: (i) a first part including a food bowl assembly having a first bowl, a second feeding bowl disposed within the first bowl, and a separating module, and (ii) a second part comprising an olfactive product; for use in a method for treating and/or preventing a disease or disorder in a mammal wherein a food adapted for treating and/or preventing the said disease or disorder causes food aversion in the said mammal.

A disease or disorder can cause hyposmia, partial anosmia, loss of appetite, food aversion which can lead to weight loss and increase mammal distress.

As used herein, a disease or disorder according to the present disclosure can be selected from the group consisting of obesity, anorexia, hypertension, heart disease, chronic food allergies, severe osteoarthritis, renal disease, diabetes mellitus, urinary incontinence, bladder stones, chronic urinary tract infections, gastroenteritis, pancreatitis, depression, hypothyroidism, cancer, cardiac disease, ageing, immune-depressive disease.

As detailed elsewhere in the present specification and as shown in the examples, the kit described herein acts positively on the food aversion of the mammals, i.e. cats and/or dogs.

In particular, the mammals feed with a low palatability food composition such as an anallergic or hypoallergenic diets or food compositions.

According to a further embodiment, the kit is used in a method for preventing and/or treating a mammal affected with a disease or disorder caused by food aversion, more preferably of a mammal affected with a renal disease.

As used herein, the term "preventing", may also include the reduction of a likelihood of occurrence, or of re-occurrence, of a given condition in a mammal.

The time period of feeding with a kit as described herein may range from several weeks to several years, depending notably on the treatment period of the disease treated.

According to the inventors, for wet food, the kit of the present disclosure allows to avoid food waste as the mammal's food composition is eaten directly after being served. Indeed, a food composition that remains in the air for too long will dry, and may oxidize or become contaminated and thus be wasted.

In a further embodiment, the kit of the present disclosure is used for increasing the palatability of a food composition, particularly the palatability of a low palatability food composition, i.e. a hypoallergenic diet or an anallergenic diet.

Methods and Other Non-Therapeutic Applications

In an embodiment, the present disclosure relates to a method for stimulating the appetite of a mammal, said method including the steps of:
(i) providing a kit as described throughout the present disclosure,
(ii) placing the olfactive product of the second part in the separating module (within the odour chamber if present) of the food bowl assembly,
(iii) placing a food composition in the second feeding bowl so as to provide an operational food bowl assembly, and
(iv) allowing a mammal to access the operational food bowl assembly obtained at step (iii).

In a particular embodiment of the disclosure, the mammal for which it is intended to stimulate the appetite is an ageing or a senior mammal.

The invention also relates to a kit for use in a method for stimulating appetite of a mammal, increasing attractiveness of a food, compensating the lack of fat in a food, for aromatizing the environment of the food bowl assembly to enhance water intake, increasing the flavor and/or odor concentration, stimulating the olfaction sense, limiting the monotony effect with the same food, treating olfaction dysfunction, appetite loss or food aversion due to a disease in a mammal.

A further aspect of the present disclosure relates to a method for stimulating appetite and/or attractiveness of a food to increase the palatability of food and to allow the mammal to eat the daily calorie intake recommended. This can be useful for low palatability food composition or also during stress situation.

A further aspect of the present disclosure relates to a method for compensating the lack of fat on the diet with aromatic attraction to stimulate the appetite of the more healthy diet (but less palatable). This will allow or help the mammal to go until the end of a weight management program for example.

A further aspect of the present disclosure relates to a method for aromatizing the environment of the food bowl assembly to enhance water intake. This will have a particular interest for mammal, such as cat, known to not drink enough water.

A further aspect of the present disclosure relates to a method for increasing the smell of the food composition to increase attractiveness of the diet for mammal with a limited olfaction acuity (natural, pathology, etc. . . . ). For example, for dogs, it can be useful for brachycephalic breeds having lower olfaction acuity because of their narrow nostrils and/or low airflow.

A further aspect of the present disclosure relates to a method for maximizing the chances that a mammal accepts a new food composition. For example, it can help breeders to facilitate the transition for kitten or puppy from mother milk to solid food composition, i.e. dry, wet or semi-moist food composition.

It can also be used for food transition. For example, to maximize the chance that pets accept a new food composition, the kit according to the present disclosure can be used before, during and/or after the transition to have a common odour that the pets will recognize in the two foods, helping the transition, like an odour imprinting.

A further aspect of the present disclosure relates to a method to increase the flavour and/or odour concentration during strong weather conditions to increase attractiveness. This may be very helpful for example for sled dog who have to feed under strong weather conditions during runs where because of low temperature, flavours are not well released.

Ageing or senior mammals are losing their main sense, including olfaction over year ageing. As a consequence, appetite may decrease.

Another aspect of the present disclosure may consist of a method to stimulate the olfaction sense to enhance the meal experience and the calories intake for the ageing mammal population.

A further aspect of the present disclosure relates to a method to limit the monotony effect with some food composition, more particularly dry food composition. The food bowl assembly according to the disclosure may be used as a tool to make vary the flavour and stimulate the mammal to consume giving the parent/owner of participating emotionally to the meal event of the mammal. This can apply more particular to babies, kitten/puppies, x-small dog or cat.

Another particular preferred embodiment of the disclosure is a method for screening and identify the flavour or the olfactive product preferred by a mammal. For example, as a non-limitative example, it can be useful in the course of individualization is programs. The kit according to the present disclosure can be used as a tool able to deliver olfactive driver to the mammal to fit with their individual preference. The kit according to the present disclosure can be used as a diagnostic tool to help the screening and the identification of the right compound(s) for the individual mammal switching different families of drivers.

Another embodiment of the disclosure relates to a method for screening and identify the olfactive product preferred by a mammal, said method comprising the step of:
  (i) providing a kit according to the present disclosure,
  (ii) placing the olfactive product to be tested of the second part in the separating module (within the odour chamber if present) of the food bowl assembly,
  (iii) placing a food composition in the second feeding bowl so as to provide an operational food bowl assembly, and
  (iv) allowing a mammal to access the operational food bowl assembly obtained at step (iii),
  (v) repeating steps (i) to (iv) for each olfactive product to be tested,
  (vi) selecting the olfactive product for which the mammal has shown preferences for the food in the second feeding bowl.

A particular advantage of this method is that it can be done directly at home by the pet owner. Another advantage is that it can be repeated so as to take into consideration the potential evolution of the mammal preferences.

Another potential use or application of the disclosure is to help the diagnosis or the prediction of neurodegenerative diseases. For example, a reduction of the sense of smell is often an early sign of disease such as neurodegenerative diseases. The food bowl assembly of the present disclosure may be used to diagnose odour threshold and could offer a new way to predict the development of these degenerative diseases.

Another advantage of the disclosure is to help to maintain palatability and stimulate appetite with food composition having a decreased palatability level. This can be the case for food composition in which the level of palatant has been decreased or for products for which the palatability performance of palatants have been reduced over the shelf-life.

EXAMPLES

1/Material and Methods
1.1 The following Examples 1 and 6 have been done according the protocol "ranking wet cat" as described hereunder.

A Ranking test may be used to assess the intake of products by the pet following a monadic (single) product presentation. A crossover design is employed to ensure all products are tested on each day of the test. Each product is ranked alongside the others based on intake. Standard Ranking tests are typically used to assess between 2 and 4 products. The following hypotheses are used. The expected results of the trial must be stated prior to the trial commencing.

Null Hypothesis
  Cats do not differentiate between the products offered, i.e. the difference in average intake between the products is not significant (p-value >0.05 mixed model ANOVA).
  A minimum of 30 healthy adult cats must be used for cattery trials.
    Wet: All products must be offered to the cat for 20 minutes.
    Dry: All products must be offered to the cat for 16 hours.
  The food is offered in excess to enable the assessment of differences in feeding performance.
  The morning feed in a wet test is classified as the test meal. The overnight dry feed is classified as the test meal in the dry test.
  Table 1 below details how much must be offered for a wet or dry cat Ranking test in a Cattery:

TABLE 1

Cattery Tests: Amounts of food to be offered in a Ranking test

| Time of Feeding | Format | Duration of Exposure | Amount Offered |
|---|---|---|---|
| Wet Test: | | | |
| AM | WET | 20 minutes | 170 g (+/−3 g) |
| PM | WET | 20 minutes | 170 g (+/−3 g) |
| Overnight | DRY | 16 hours | 25 g (+/−2 g) |
| Dry Test: | | | |
| AM | WET | 20 minutes | 100 g (+/−3 g) |
| PM | WET | 20 minutes | 100 g (+/−3 g) |
| Overnight | DRY | 16 hours | 60 g (+/−2 g) |

The fixed amount feeding regime must be maintained during rest days ensure consistency.

For any cat with 5% above/below ideal body weight the non-test meal can be adjusted accordingly to maintain ideal body weight. The dry overnight feed the day before the wet test must not be adjusted to help maintain bodyweight.

Appropriate product rotations are used to ensure there is no bias due to product presentation order or day effects.

One product is offered each day, and pets will test all the products during the feeding trial.

If using 30 cats then the minimum number of exposures per product in a test is two. For standard analysis a 5% significance level is used, this level of significance is the default option for analysis. A mixed model analysis will be performed on intake (g). This will be used to assess the difference in mean intake between test products, at the 5% significance level. Pair wise comparisons between products will be made using Tukey HSD tests. The mean intake for each product will be reported with 95% Tukey HSD comparison intervals. Results from the mixed model ANOVA must be interpreted as follows:
  $\alpha$ is the "critical p-value" set before the test (e.g. $\alpha=<0.05$ or $\alpha=<0.1$ depending of test objectives).
  p-value $>\alpha$—one or more products are not significantly different (not significantly different is not the same as parity. Parity can only be stated when must be reserved for use Equivalence or Non-inferiority tests are performed) in feeding performance. It is important to note here that this does not mean the products are 'the same' and a non-inferiority test must be constructed to draw this conclusion.

p-value≤α—one or more products are significantly higher in feeding performance.

1.2 The following Examples 2, 3, 4, 5, 9 and 10 have been done according to the protocol "versus wet cat" as described hereunder.

Difference tests involve simultaneous presentation of two products. A crossover design is used to ensure FBA position does not bias the outcome of trials.

The following hypotheses are used. There should be a statement up-front on the expected results of the test.

Null Hypothesis: There will be no difference in intake between the products i.e. the weighted average of the difference between intakes is not significant.

A minimum of 30 healthy adult cats must be used for cattery trials.

The number of products in a Difference test is two.

Wet: All products must be offered to the cat for 20 minutes.

Dry: All products must be offered to the cat for 16 hours.

The food is offered in excess to enable the assessment of differences in feeding performance.

If carrying out the difference test over two days then the morning feed must be the test feed.

Table below details how much must be offered for a wet or dry cat Difference test in a cattery:

TABLE 2

Cattery Test: Amounts of food to be offered in a Difference test

| Time of Feeding | Format | Duration of Exposure | Amount Offered |
|---|---|---|---|
| Wet Test: | | | |
| AM | WET | 20 minutes | 2x FBA of 150 g +/− 3 g |
| PM | WET | 20 minutes | 150 g +/−3 g (2x FBA if difference test on 1 day) |
| Overnight | DRY | 16 hours | 25 g (+/−2 g) |
| Dry Test: | | | |
| AM | WET | 20 minutes | 100 g (+/−3 g) |
| PM | WET | 20 minutes | 100 g (+/−3 g) |
| Overnight | DRY | 16 hours | 2x FBA 60 g (+/−2 g) |

FBA: Food bowl assembly

For any cat with 5% above or below ideal body weight the non-test meal can be adjusted accordingly to maintain ideal body weight.

Pets must be placed in groups (i.e., Group A, Group B, etc.) so there is a reference in the test documentation which order the cats have been exposed to the products. Appropriate product rotations are used to ensure there is no bias due to product order or day.

5% significance level must be used for all tests unless there are specific requirements in the study intent.

A mixed model analysis will be performed on the difference in intake (g), including cat as a factor and weighting by grouped cat specific variability. This will be used to assess the mean difference in intake between the two diets, at the 5% significance level. The mean difference in intake will be reported with a 95% confidence interval.

Output includes:

Weighted Mean difference and 95% confidence interval—shows the average weighted mean difference between the products.

Mean product difference by pet—shows the mean difference for each pet.

Hurdle analysis—reporting data as twice eaten product A over product B or vice versa.

Boxplot of mean eaten by product—shows the median and mean value of each product. The boxplot shows outlying data from the average with 95% confidence intervals indicated.

Results from the mixed model ANOVA must be interpreted as follows:

p-value >0.05—both products are not significantly different in feeding performance (i.e. no effect of difference has been proven/shown in the conditions of the test for the products assessed).

p-value 0.05—one product is significantly different in feeding performance.

1.3 The following Examples 7 and 8 have been done according to the protocol "versus dry dog" as described hereinunder.

Difference tests involve simultaneous presentation of two products. A crossover design is used to ensure FBA position does not bias the outcome of trials. The kennel data is collected and analysed in a binary format based on which meal is consumed first.

The expected results of the trial must be stated prior to the trial commencing.

The following hypotheses are used.

Null Hypothesis

Kennel

There is no significant difference between the proportion of meals eaten/consumed where product 'A' is finished first compared to where product 'B' is finished first (p-value >0.05 in a permutation test, performed using the feeding methodology statistical toolkit).

A minimum of 30 healthy adult dogs must be used for kennel trials.

The number of products in a Difference test is two.

Food is offered to a dog metabolic energy requirements (MER) on test and rest days.

25% of MER must be offered in each FBA during the test (total of 100% MER per day).

Dogs must be weighed weekly and MER adjusted accordingly to maintain ideal bodyweight.

Uneaten food must not be re-offered to the dog on test days.

See table below for feeding regime during the trial:

TABLE 3

| | Amount Offered in Test | | |
|---|---|---|---|
| | Rest Day | Test Day | Rest Day |
| AM | Wet (between 25%-50% MER) Background Product | 25% Product 1 25% Product 2 (product technology dependant on test: wet or dry) | Wet (between 25%-50% MER) Background Product |

TABLE 3-continued

| | Amount Offered in Test | | |
|---|---|---|---|
| | Rest Day | Test Day | Rest Day |
| PM | Dry (between 50%-75% MER) Background Product | 25% Product 2 25% Product 1 (same diets as am feed) | Dry (between 50%-75% MER) Background Product |

Pets must be placed in groups (i.e. Group A, Group B, etc.) so that there is a reference in the test documentation as to which order the dogs have been exposed to the products. Appropriate product rotations are used to ensure there is no bias due to product order or day effect.

Dogs must be calm prior to offering meal.

Food bowl assemblies must be placed in a position where the pet carer can observe the meal during feeding.

The pet carer must record which FBA is sampled first during the test.

During the test each dog must be observed by the carer until the point where one FBA has been entirely consumed (>90% of diet consumed).

The carer can observe multiple dogs at the same time within the test as long as they have the ability to clearly evaluate first choice and first product consumed for each of the dogs they are observing.

If the dog has not sampled either FBA after 5 minutes, this can be classified as a REFUSAL.

The carer must record which diet has been completed first. If neither FBA of food has been entirely consumed at 10 minutes, then this must be recorded as "both products performing equally i.e. a TIE".

If a dog has greater than two 'head turns' during a meal then this classified as a TIE i.e. changed choice of product (prior to eating 90% of one FBA), more than twice following the first choice.

Any diet not consumed after 20 minutes must be weighed and recorded.

There is no requirement for observation during the meal once the one of the food bowl assemblies of food is consumed.

A meal is defined as being entirely consumed when a dog has eaten all or almost all (>90%) of the product in one FBA.

Permutation Testing must be used to analyze the binary data for First Finished and First Choice.

Results from the permutation test or ANOVA must be interpreted as follows:

p-value >0.05—both products are not significantly different in the variable of interest performance (i.e. no effect of difference has been proven/shown in the conditions of the test for the products assessed). It is important to note here that this does not mean the products are 'the same' and a non-inferiority test must be constructed to draw this conclusion.

p-value ≤0.05—one product is significantly different in the variable of interest.

During the tests, only animals eating more than 5 g/meals are included in the analysis (validated number).

The composition of the food compositions used in the present examples are

Instinctive gravy composition: Meat and animal derivatives, fish and fish derivatives, vegetable protein extracts, cereals, derivatives of vegetable origin, minerals, various sugars. Vitamin D3: 35 IU, E1 (Iron): 3 mg, E2 (Iodine): 0.35 mg, E4 (Copper): 2.8 mg, E5 (Manganese): 0.9 mg, E6 (Zinc): 9 mg.

Renal Select Feline dry composition: animal fats, rice, precooked wheat flour, dehydrated pork protein*, wheat flour, vegetable fibres, maize gluten, wheat gluten*, hydrolysed animal proteins, dehydrated fish, minerals, chicory pulp, fish oil, soya oil, fructo-oligosaccharides, psyllium husks and seeds, marigold extract (source of lutein). Additives (per kg): Nutritional additives: Vitamin A: 20800 IU, Vitamin D3: 800 IU, E1 (Iron): 44 mg, E2 (Iodine): 4.5 mg, E4 (Copper): 14 mg, E5 (Manganese): 58 mg, E6 (Zinc): 173 mg, E8 (Selenium): 0.08 mg—Technological additives: Clinoptilolite of sedimentary origin: 10 g—Preservatives—Antioxidants. Analytical constituents: Protein: 24.5%—Fat content: 21.5%—Crude ash: 6.4%—Crude fiber: 4.6%—Calcium: 0.7%—Phosphorus: 0.41%—Potassium: 0.9%—Sodium: 0.45%—Magnesium: 0.08%—Chloride: 0.91%—Sulphur: 0.4%—Vitamin D (total): 800 IU/kg—Hydroxyproline: 0.42%—Essential fatty acids: 3.53%—EPA and DHA: 0.41%.

Medium adult dry composition: Brewers rice, chicken by-product meal, oat groats, wheat, corn gluten meal, chicken fat, natural flavors, dried plain beet pulp, fish oil, calcium carbonate, vegetable oil, potassium chloride, salt, monocalcium phosphate, choline chloride, hydrolyzed yeast, vitamins [DL-alpha tocopherol acetate (source of vitamin E), L-ascorbyl-2-polyphosphate (source of vitamin C), biotin, D-calcium pantothenate, vitamin A acetate, niacin supplement, pyridoxine hydrochloride (vitamin B6), thiamine mononitrate (vitamin B1), vitamin B12 supplement, riboflavin supplement, vitamin D3 supplement, folic acid], L-lysine, trace minerals [zinc proteinate, zinc oxide, ferrous sulfate, manganese proteinate, manganous oxide, copper sulfate, calcium iodate, sodium selenite, copper proteinate], magnesium oxide, rosemary extract, preserved with mixed tocopherols and citric acid.

Hypoallergenic dry composition: rice, hydrolysed soya protein isolate, animal fats, minerals, hydrolysed poultry liver, beet pulp, soya oil, fructo-oligo-saccharides, fish oil, borage oil, marigold extract (source of lutein). Additives (per kg): Nutritional additives: Vitamin A: 24800 IU, Vitamin D3: 800 IU, E1 (Iron): 40 mg, E2 (Iodine): 3 mg, E4 (Copper): 11 mg, E5 (Manganese): 53 mg, E6 (Zinc): 202 mg—Preservatives—Antioxidants. Analytical constituents: Protein: 210%—Fat content: 19%—Crude ash: 8.4%—Crude fibres: 1%—Per kg: EPA/DHA: 3.4 g—Essential fatty acids: 47 g.

The food bowl assembly (FBA) according to the present disclosure was used in all examples. In the examples below, a food composition was placed in the second feeding bowl and an olfactive product was placed in the cavity of the separating module.

2/Results

Example 1: Palatability of Instinctive+Olfactive Product 1 Over Instinctive+Water, Instinctive+Lemon Juice Thirty-six cats were enrolled and 36 were validated.

The test was done on 11 days. The exposure lasted 20 minutes.

The cats were fed once daily in the morning. Cats were exposed to two products at once.

The same quantity of food was given in the second feeding bowl.

Olfactive Product 1 consist of an internal palatability enhancer for cats (not disclose here).

TABLE 4

| Food compositions and olfactive products | | | |
|---|---|---|---|
| Product A | Product B | Product C | Product D |
| Instinctive + water | Instinctive + Tuna | Instinctive + Lemon Juice | Instinctive + Olfactive Product 1 |

TABLE 5

Mean Product differences

| Product Difference | Mean | Standard Error | P-Value | 95% Confidence Interval Lower | 95% Confidence Interval Upper |
|---|---|---|---|---|---|
| Instinctive + Olfactive Product 1 – Instinctive + Tuna | −19.31 | 4.01 | 0.0934 | −1 | 19.62 |
| Instinctive + Olfactive Product 1 – Instinctive + water | 10.38 | 4.01 | 0.048 | 0.07 | 20.69 |
| Instinctive + Olfactive Product 1 – Instinctive + Lemon Juice | 14 | 4.01 | 0.0029 | 3.69 | 24.31 |
| Instinctive + Tuna – Instinctive + water | 1.07 | 4.01 | 0.9934 | −9.24 | 11.38 |
| Instinctive + Tuna – Instinctive + Lemon Juice | 4.69 | 4.01 | 0.6472 | −5.62 | 15 |
| Instinctive + water – Instinctive + Lemon Juice | 3.62 | 4.01 | 0.8041 | −6.69 | 13.93 |

A highly significant difference in consumption between products is observed on this test.

There is no significant difference between product D (Instinctive+Olfactive Product 1) and product B (Instinctive+Tuna). There is no significant difference between product B (Instinctive+Tuna) and product A (Instinctive+water). There is no significant difference between product B (Instinctive+Tuna) and product C (Instinctive+Lemon Juice). There is no significant difference between product A (Instinctive+water) and product C (Instinctive+Lemon Juice).

However, product D (Instinctive+Olfactive Product 1) is highly significantly more consumed than product C (Instinctive+Lemon Juice) (p=0.0029). Product D (Instinctive+Olfactive Product 1) is significantly more consumed than product A (Instinctive+water) (p=0.048).

Example 2: Palatability of Renal+Olfactive Product 1 Over Renal+Water

Thirty-six cats were enrolled and 33 were validated.

The test was done on 1 day. The cats were fed twice a day; one in the morning, one in the afternoon. The exposure lasted 20 minutes.

The same quantity of food was given in the second feeding bowl.

TABLE 6

| Food compositions and olfactive products | |
|---|---|
| Product E | Product F |
| Renal + water | Renal + Olfactive Product 1 |

TABLE 7

Mean Product Differences

| | | | |
|---|---|---|---|
| Mean product E (g) | 29.54 | Ratio E (%) | 40.58% |
| Mean product F (g) | 52.46 | Ratio F (%) | 59.42% |
| Significance of the difference between E and F (p < 0.05) | | 0.000190 | |

TABLE 8

| Probability preference vs. first choice of the cats | | | |
|---|---|---|---|
| Preference | E: 11%/F: 48%/No choice: 41% | First Choice | E: 47%/F: 53% |
| Preference Probability (p < 0.05) | 0.000122 | Probability First Choice (p < 0.05) | 0.711923 |

There is no significant probability for the first choice. However, there is a high significant probability for the preference choice.

Consequently, product F (Renal+Olfactive Product 1) is very highly significantly more consumed than product E (Renal+water).

Example 3: Palatability of Instinctive Over Renal

Thirty-six cats were enrolled and 34 were validated.

The test was done on 1 day. The exposure lasted 20 minutes.

The cats were fed twice a day. Cats were exposed to the two products at once.

The same quantity of food was given in the second feeding bowl.

TABLE 9

| Wet food compositions | | | |
|---|---|---|---|
| Name | Packaging | Aspect | Room T° C. |
| Product E | Renal + water | Pouch | Chunks in gravy (CIG) | 22.9° C. |
| Product A | Instinctive + water | Pouch | Chunks in gravy (CIG) | 22.2° C. |

TABLE 10

| Mean Product Differences | | | |
|---|---|---|---|
| Mean product E (g) | 44.96 | Ratio E (%) | 39.82% |
| Mean product A (g) | 66.26 | Ratio A (%) | 60.18% |
| Significance of the difference between E and A (p < 0.05) | | 0.046493 | |

TABLE 11

| Probability preference vs. first choice of the cats | | | |
|---|---|---|---|
| Preference | E: 82%/A: 54%/No choice: 18% | First Choice | E: 49%/A: 51% |
| Preference Probability (p < 0.05) | 0.023103 | Probability First Choice (p < 0.05) | 0.903479 |

There is no significant probability for the first choice. However, there is a high significant probability for the preference choice.

Consequently, product A (Instinctive) is significantly more consumed than product E (Renal).

Example 4: Palatability of Renal+Olfactive Product 1 Same of Instinctive while Instinctive has a Better Performance than Renal in Example 3

Thirty-five cats were enrolled and 32 were validated.

The test was done on 1 day. The exposure lasted 20 minutes.

The cats were fed twice a day. Cats were exposed to the two products at once.

The same quantity of food was given in the second feeding bowl.

TABLE 12

| Wet food compositions and olfactive products | |
|---|---|
| Product A | Product F |
| Instinctive (CIG) + water | Renal + Olfactive Product 1 (CIG) |

TABLE 13

| Mean Product Differences | | | |
|---|---|---|---|
| Mean product A (g) | 50.64 | Ratio A (%) | 57.64% |
| Mean product F (g) | 38.64 | Ratio F (%) | 42.36% |
| Significance of the difference between A and F (p < 0.05) | | 0.176779 | |

TABLE 14

| Probability preference vs. first choice of the cats | | | |
|---|---|---|---|
| Preference | A: 52%/F: 22%/No choice: 26% | First Choice | A: 52%/F: 48% |
| Preference Probability (p < 0.05) | 0.008650 | Probability First Choice (p < 0.05) | 0.900523 |

There is no significant difference between product A (Instinctive+water) and product F (Renal+Olfactive Product 1).

Thus, product F (Renal+Olfactive Product 1) achieves the same performance as Instinctive while Renal was significantly less attractive in Example 3. Consequently, Olfactive Product 1 increases Renal's palatability.

Example 5: Palatability of Renal+Olfactive Product 2 Over Renal

Thirty-five cats were enrolled and 30 were validated.

The test was done on 1 day. The exposure lasted 20 minutes.

The cats were fed twice a day. Cats were exposed to the two products at once.

The same quantity of food was given in the second feeding bowl.

Olfactive Compound 2 consists of a liquid palatability enhancer for pets from the chemical family of aldehydes.

TABLE 15

| Dry food compositions and olfactive products | |
|---|---|
| Product E | Product L |
| RENAL + water | RENAL + Olfactive Product 2 |

TABLE 16

| Mean Product Differences | | | |
|---|---|---|---|
| Mean product E (g) | 33.79 | Ratio E (%) | 46.48% |
| Mean product L (g) | 37.72 | Ratio L (%) | 53.52% |
| Significance of the difference between E and L (p < 0.05) | | 0.321465 | |

TABLE 17

| Probability preference vs. first choice of the cats | | | |
|---|---|---|---|
| Preference | E: 23%/L: 37%/No choice: 40% | First Choice | E: 38%/L: 62% |
| Preference Probability (p < 0.05) | 0.243345 | Probability First Choice (p < 0.05) | 0.093290 |

There is no significant difference between product L (Renal+Olfactive Product 2) and product E (Renal+water). Nevertheless, it remains a tendency for product L.

Example 6: Palatability of Instinctive+Compound Po+Compound Pe

Thirty-six cats were enrolled and 36 were validated.

The test was done on 8 days. The exposure lasted 20 minutes.

The cats were fed once a day in the morning. Cats were exposed to two products at once.

The same quantity of food was given in the second feeding bowl.

TABLE 18

| Wet food compositions and olfactive products | | | |
|---|---|---|---|
| Product M | Product N | Product O | Product A |
| Instinctive + Compound Po | Instinctive + vanillin | Instinctive + Compound Pe | Instinctive + water |

TABLE 19

| Mean Product Differences | | | |
|---|---|---|---|
| Mean product M (g) | 98.83% | Mean product O (g) | 90.59% |
| Mean product N (g) | 86.93% | Mean product A (g) | 96.39% |
| Significance | | | 0.008663 |

TABLE 20

| Mean Product Differences | | | | | |
|---|---|---|---|---|---|
| | | Standard | P- | 95% Confidence Interval | |
| Product Difference | Mean | Error | Value | Lower | Upper |
| Instinctive + Compound Po/ Instinctive + water | 2.44 | 4.03 | 0.9307 | −7.92 | 12.8 |
| Instinctive + Compound Po Instinctive + Compound Pe | 7.43 | 4.05 | 0.257 | −2.98 | 17.83 |
| Instinctive + Compound Po/ Instinctive + vanillin | 13.09 | 4.05 | 0.0068 | 2.68 | 23.5 |
| Instinctive + water/ Instinctive + Compound Pe | 4.99 | 4.05 | 0.6061 | −5.41 | 15.39 |
| INSTINCTIVE + water/ Instinctive + vanillin | 10.66 | 4.05 | 0.0425 | 0.25 | 21.06 |
| Instinctive + Compound Pe Instinctive + vanillin | 5.67 | 4.07 | 0.5034 | −4.78 | 16.12 |

A highly significant difference in consumption between products is observed on this test.

There is no significant difference between product M (Instinctive+Compound Po) and product A (Instinctive+ water).

There is no significant difference between product M (Instinctive+Compound Po) and product O (Instinctive+ Compound Pe).

Product M (Instinctive+Compound Po) is highly significantly more consumed than product N (Instinctive+vanillin) (p=0.0068).

There is no significant difference between product A (Instinctive+water) and product O (Instinctive+Compound Pe).

Product A (Instinctive+water) is significantly more consumed than product B (Instinctive+vanillin) (p=0.0425).

There is no significant difference between product C (Instinctive+Compound Pe) and product N (Instinctive+ vanillin).

Example 7: Palatability of MEDIUM Adult+Olfactive Product 3 Over MEDIUM Adult

Twenty-three dogs were enrolled and 23 were validated.

The test was done on 1 day.

The dogs were fed once a day. Dogs were exposed to the two products at once.

The same quantity of products was given in the FBA.

Olfative Product 3 consists of an internal liquid palatability enhancer for dogs (not disclosed).

TABLE 21

| Dry food compositions and olfactive products | |
|---|---|
| Product P | Product Q |
| Medium Adult + Olfactive Product 3 | Medium Adult + water |

TABLE 22

| Mean Product Differences | | | |
|---|---|---|---|
| Mean product P (g) | 33.79 | Ratio P (%) | 46.48% |
| Mean product Q (g) | 37.72 | Ratio Q (%) | 53.52% |
| Significance of the difference between P and Q (p < 0.05) | | 0.321465 | |

TABLE 23

| Probability preference vs. first choice of the dogs | | | |
|---|---|---|---|
| Preference | P: 73%/Q: 27%/ No choice: 20% | First Choice | P: 80%/Q: 20% |
| Preference Probability (p < 0.05) | 0.000000 | Probability First Choice (p < 0.05) | 0.000000 |

Product P (Medium Adult+LX1) is significantly preferred compared to product Q (Medium Adult+water).

Example 8: Palatability of Dry Product Hypo+Olfactive Product 3 Over MEDIUM Adult Thirty dogs were enrolled and 30 were validated.

The test was done on 1 day.

The dogs were twice a day. Dogs were exposed to the two products at once.

Olfactive Product 3 consists of a liquid palatability enhancer for pets (not disclosed).

TABLE 24

| Dry food compositions and olfactive products | |
|---|---|
| Product Q | Product S |
| Medium Adult + water | Hypo + Olfactive Product 3 |

TABLE 25

| Probability preference vs. first choice of the dogs | | | |
|---|---|---|---|
| Preference | Q: 24%/S: 76%/ No choice: 2% | First Choice | Q: 12%/S: 88% |
| Preference Probability ($p < 0.05$) | 0.000000 | Probability First Choice ($p < 0.05$) | 0.000000 |

Product S (Hypo+Olfactive Product 3) is very highly significantly preferred compared to product Q (Medium Adult+water).

Example 9: Palatability of Instinctive+Olfactive Mix1 Over Instinctive

Thirty-four cats were enrolled and 33 were validated.

The test was done on 1 day. The exposure lasted 20 minutes.

The same quantity of products was given in the FBA.

The product Olfactive Mix1 consists of a combination of three different compounds Po+Re+Sm.

TABLE 26

| Food compositions and olfactive products | | | |
|---|---|---|---|
| | Name | Format | Packaging |
| Product 1 | Instinctive | CIG | pouch |
| Product 2 | Instinctive + Olfactory Mix1 | CIG | pouch |

TABLE 27

| Mean Product Differences | | | |
|---|---|---|---|
| Mean product 1 (g) | 43.71 | Ratio product 1 (%) | 40.59 |
| Mean product 2 (g) | 62.94 | Ratio product2 (%) | 59.41 |
| Significance of the difference between products 1 and 2 ($p < 0.05$) | | 0.030742 | |

TABLE 28

| Probability preference vs. first choice of the cats 15% | | | |
|---|---|---|---|
| Preference | Product1: 15% \| Product2: 30% \| No Choice: 55% | First Choice | Product1: 27% \| Product2: 73% |
| Preference Probability ($p < 0.05$) | 0.3017 | Probability First Choice ($p < 0.005$) | 0.014806 |

There is a significant difference in term of 1rst choice between product 1 (Instinctive) and product 2 (Instinctive+ Olfactive Mix1). Product 2 has been significantly more consumed than product1.

The Olfactive Mix1 is a non-optimized solution in term of compound concentrations. Nevertheless, here, it has been demonstrated that the performance of the product when it is combined to the Olfactive Mix1 with the use of this kit was significantly improved.

Example 10: Palatability of Instinctive+Olfactive Mix2 Over Instinctive

Thirty-four cats were enrolled and 32 were validated.
The test was done on 1 day.

The cats were fed twice a day; one in the morning, one in the afternoon. The exposure lasted 20 minutes.

The same quantity of products was given in the FBA.

The product Olfactive Mix2 consists of a combination of several compounds: Compound Po+compound Re+compound Sm+compound Pe.

TABLE 29

| Food compositions and olfactive products | | | | |
|---|---|---|---|---|
| | Name | Format | Packaging | Room T (° C.) |
| Product 3 | Instinctive | CIG | pouch | 22.7 |
| Product 4 | Instinctive + Olfactive Mix2 | CIG | pouch | 22.9 |

TABLE 30

| Mean Product Differences | | | |
|---|---|---|---|
| Mean product 3 (g) | 39.51 | Ratio product3 (%) | 46.43% |
| Mean product 4 (g) | 49.32 | Ratio product4 (%) | 53.57% |
| Significance of the difference between products 3 and 4 ($p < 0.05$) | | 0.093997 | |

TABLE 31

| Probability preference vs. first choice of the cats | | | |
|---|---|---|---|
| Preference | Product3: 33% \| product4: 45% \| No Choice: 22% | First Choice | Product3: 47%\| product4: 53% |
| Preference Probability ($p < 0.05$) | 0.322199 | Probability First Choice ($p < 0.05$) | 0.707661 |

There is no significant difference in term of 1rst choice between product 3 (Instinctive) and product 4 (Instinctive+ Olfactive Mix2). But there is a clear tendency of increasing the consumption of the product 4.

The Olfactive Mix2 is a non-optimized solution in term of compound concentrations. Nevertheless, here, we have demonstrated that we have increased the consumption of the product when it is combined to the Olfactive Mix2 with the use of this disclosure.

Example 11: Palatability Performance of Sterilized+Olfactive Stimulators

One sick cat has tested the kit according to the disclosure. This animal (Domestic shorthair) has an auto-immune illness. At the moment of crisis, there is a loss of appetite. At the beginning of the crisis, the change of diet helped the cat to eat. But after one exposure, the cat refused the diet.

The test occurred during a crisis until the end of it. After this test, the cat was able to eat again its usual diet with no more aversion.

The cat was fed twice a day with a wet finished product. The exposure lasted the meal (around 20 minutes). The food Royal Canin Sterilised® referred as "RC Sterilised" was placed in the second feeding bowl alone (Product A) or with a different olfactive compound placed in the separating module (Product B, C and D). The same quantity of food was given in the second feeding bowl of the kit at each meal, i.e. 85 g.

TABLE 32

Products compositions and olfactive products

| Product A | Product B | Product C | Product D |
|---|---|---|---|
| RC Sterilised | RC Sterilised + Tuna | RC Sterilised + liquid with "compound Re" | RC Sterilised + Cooked Meat (ham) |

TABLE 33

Results during the crisis

| Diets | Observed behaviour |
|---|---|
| Product A (usual diet) | Refused several times |
| Different Royal Canin Diets | Accepted at first exposure then refused |
| Product B | Accepted (the entire meal has been consumed) |
| Product C | Accepted (the entire meal has been consumed) |
| Product D | Accepted (the entire meal has been consumed) |

The sick animal could not eat its usual diet during the crisis and health care were difficult. With the help of the kit of the present disclosure, the cat regained appetite and restarted to eat.

Example 12: Palatability Performance of Renal+Olfactive Stimulators

One sick senior dog has tested the kit according to the disclosure. This animal (Beagle) had a severe CKD (Chronic Kidney Disease). At each crisis, there was a loss of appetite with aversion. At the last stage of the CKD (stage 4), the pet stopped eating. The change of diet could not help the dog to eat.

The test occurred during the last stage of the CKD. The dog was fed twice a day with a dry finished product. The exposure lasted the meal duration (no time limitation). The food Royal Canin Canine Renal® referred as RC Canine Renal was placed in the second feeding bowl alone (Product A) or with an olfactive compound placed in the separating module (Product B). The same quantity of food was given in the second feeding bowl of the kit at each meal, i.e. 100 g.

TABLE 34

Products compositions and olfactive products

| Product A | Product B |
|---|---|
| RC Canine Renal | RC Canine Renal + LX1 |

TABLE 35

Results during the crisis

| Diets | Observed behaviour |
|---|---|
| Product A | Refused |
| Product B | Accepted during 3 days |

The sick animal had an aversion to food and was not able to eat. A positive signal has been observed with the kit of the disclosure and worked on the 3 first days of the test. Then, the dog stopped eating, the stage of the disease was too advanced.

Example 13: Efficacy Protocol on Targeted Cat and Dog Population

The objective of the protocol is to measure the efficacy of the kit of the disclosure on targeted pet population. 30 cats and 30 dogs are recruited. The inclusion criteria are ageing and/or potential pathologies (i.e. renal disease, loss of appetite, anorexia . . . ). The daily portion of the recommended product (wet and dry food), adapted to the targeted pet population (life-stage, pathology . . . ) is dosed either in the odor bowl with aromatic substance or without the aromatic substance. The quantity eaten are measured (every day for dry, twice a day for wet). The measures are done in cross over. In addition to the quantity eaten, the satisfaction of the pet owner and the feedback of the veterinarian recommending the diet are collected. The duration of the trial is 2 weeks.

The invention claimed is:

1. A kit comprising:
   (i) a first part comprising a food bowl assembly, said food bowl assembly comprising:
      (a) a first bowl comprising side walls and a base, the first bowl configured to receive an olfactive product;
      (b) a second feeding bowl disposed within the first bowl and distanced from the first bowl by a gap extending around a rim of the second feeding bowl, the second feeding bowl comprising side walls and a solid base, an inner surface of said side walls of the second feeding bowl and the solid base being a closed surface; and
      (c) a rigid separating module disposed between the first bowl and the second feeding bowl and the separating module configured to support a bottom surface of the second feeding bowl to maintain the gap between the first feeding bowl and the second feeding bowl, wherein an odour chamber is defined by an interior of the separating module and an interior of the first bowl, the separating module adapted to surround the olfactive product received in the first bowl in the odour chamber and wherein the separating module, an interior of the first bowl side walls, an exterior of the second feeding bowl side walls and the solid base form a vent fluidly coupled with the gap and the odour chamber, the vent arranged to allow odours from the olfactive product housed within the separating module to exit the food bowl assembly between the first bowl and the side walls of the second feeding bowl so that odours do not pass through the closed surface of the second feeding bowl, wherein the separating module includes:
         one or more supporting regions configured to support the bottom surface of the second feeding bowl;
         an opening formed in the separating module and fluidly coupled with the odour chamber; and
         one or more channels defined between the one or more supporting regions, the one or more channels extending from the opening to at least one edge of the separating module to allow odours from the odour chamber to exit the food bowl assembly along the vent; and
   (ii) a second part comprising a container comprising the olfactive product.

2. The kit according to claim 1, wherein the first bowl further comprises heating means configured to heat the olfactive product.

3. The kit according to claim 1, wherein a height of the first bowl and a height of the second feeding bowl are level.

4. The kit according to claim 1, wherein the first bowl and the second feeding bowl are of similar shape.

5. The kit according to claim 1, wherein the one or more channels comprise a plurality of channels, each channel leading to different points around the edge of the separating module.

6. The kit according to claim 1, wherein the container comprising the at least one olfactive product is selected from a can, a pouch, a flask and a tube.

7. The kit according to claim 1, wherein the olfactive product is selected from fats, oils, flavours, fragrances, chemical molecules, aromas, extracts, digest, hydrolysates, protein ingredient, and carbohydrate food.

8. The kit according to claim 1, wherein the olfactive product is at least one of a liquid, a jelly, a foam, an oil, a gel, a solid, an aromatic cocktail, a patch, a powder, an alcohol, a fat or a tab.

9. The kit according to claim 1, wherein the olfactive product is a chemical molecule selected from the group consisting of acetic acid; propanoic acid; butyric acid; 3-methylbutyric acid; hexanoic acid; citric acid; tartaric acid; fumaric acid; lactic acid; hexamic acid; butyl hexanoate; heptyl formate; ethyl decanoate; ethyl capiylate; acetaldehyde; 3-methyl butanal; pentanal; heptanal; octanal; benzaldehyde; anisole; pentanol; 2-ethyl hexanol; 2,3-butanediol; thymol; carvacrol; 1,5-octadien-3-ol; acetone; 2,3-pentanedione; 2-piperidione; 2-heptanone; 1,5-octadien-3-one; ethyl vanillin; vanillin; pyrazine; methyl pyrazine; methyl pyrazine; 2,5-dimethylpyrazine; 2,6-dimethylpyrazine; 2-methyl-6-(methio)-pyrazine; 2-ethyl-3,5-dimethylpyrazine; 2-ethyl-5-methyl pyrazine; 2-ethyl-6-methylpyrazine; ethyl pyrazine; 2-pentyl furan; 2-ethylfuran; 2,5-dimethylfuran; 2-[(methyldithio)methyl]-furan; 2-(2-propenyl)-furan; 2-furanmethanol; 4-hydroxy-3(2H)-furanone and alkyl-substituted 4-hydroxy-3(2H)-furanone compounds; indole; furfural; sulphurol; 2-acetylpyridine; 2,3-dihydrothiophene; 2-methyl thiophene; 3-methyl thiophene; 2,5-dimethyl thiophene; dihydro-2-methyl-3(2H)-thiophene; benzo[b]thiophene-4-ol; 5-methyl-2-thiophenecarboxaldehyde; methyl ethyl disulfide; dimethyl trisulfide; methyl-2-methyl-3-furyl disulfide; 2-methyl-1-ethyl pyrrolidine; 2-acetylthiazole; 4-methylthiazole; 2-ethylthiazole; theanine; glutamine; tea; and a mixture thereof.

10. The kit according to claim 1, wherein the separating module further comprises supporting legs configured to raise the opening and the one or more channels above the base of the first bowl.

11. The kit according to claim 10, wherein the supporting legs define a portion of the odour chamber.

12. The kit according to claim 1, wherein the supporting regions of the separating module have a greater thickness than the one or more channels.

13. The kit according to claim 1, wherein the solid base of the second feeding bowl is configured to cover the opening of the separating module such that the one or more channels of the separating module extend from the opening to the gap.

14. The kit according to claim 1, wherein the one or more channels includes between two and twelve channels, wherein each channel is up to 1.5 centimeters wide and up to 1 centimeters deep.

15. A method for stimulating an appetite of a mammal, said method comprising:

(i) providing a kit comprising:
  a first part comprising a food bowl assembly, said food bowl assembly comprising:
    (a) a first bowl comprising side walls and a base, the first bowl configured to receive an olfactive product;
    (b) a second feeding bowl disposed within the first bowl and distanced from the first bowl by a gap extending around a rim of the second feeding bowl, the second feeding bowl comprising side walls and a solid base, an inner surface of said side walls of the second feeding bowl and the solid base being a closed surface; and
    (c) a rigid separating module disposed between the first bowl and the second feeding bowl and configured to support a bottom surface of the second feeding bowl to maintain the gap between the first feeding bowl and the second feeding bowl, wherein an odour chamber is defined by an interior of the separating module and an interior of the first bowl, the separating module adapted to surround the olfactive product received in the first bowl in the odour chamber, and wherein the separating module, an interior of the first bowl side walls, an exterior of the second feeding bowl side walls and the solid base form a vent fluidly coupled with the gap and the odour chamber, the vent arranged to allow odours from the olfactive product housed within the separating module to exit the food bowl assembly between the first bowl and the side walls of the second feeding bowl so that odours do not pass through the closed surface of the second feeding bowl, wherein the separating module includes:
      one or more supporting regions configured to support the bottom surface of the second feeding bowl;
      an opening formed in the separating module and fluidly coupled with the odour chamber; and
      one or more channels defined between the one or more supporting regions, the one or more channels extending from the opening to at least one edge of the separating module to allow odours from the odour chamber to exit the food bowl assembly along the vent; and
  a second part comprising a container comprising at least one olfactive product;
(ii) placing the olfactive product of the second part in the separating module of the food bowl assembly,
(iii) placing a food composition in the second feeding bowl, so as to provide an operational food bowl assembly, and
(iv) allowing odours of the olfactive product to evaporate from the separating module and exit through the vent into an environment close to the second feeding bowl.

16. The method of claim 15, wherein the olfactive product is configured to treat and/or prevent loss of appetite in a mammal suffering from a disease or disorder, wherein the disease or disorder is selected from the group consisting of: obesity, anorexia, hypertension, heart disease, chronic food allergies, severe osteoarthritis, diabetes mellitus, urinary incontinence, bladder stones, chronic urinary tract infections, gastroenteritis, pancreatitis, hypothyroidism, cancer, cardiac disease, ageing, and immune-depressive disease.

17. The method according to claim 15, wherein the food composition is a liquid, wet or a semi-moist food composition.

18. The method according to claim 15, wherein the olfactive product is selected from fats, oils, flavours, fragrances, chemical molecules, aromas, extracts, digest, hydrolysates, protein ingredient, carbohydrate food, a liquid, a jelly, a foam, an oil, a gel, a solid, an aromatic cocktail, a patch, a powder, an alcohol, a fat or a tab.

19. A method for screening and identify the olfactive product preferred by a mammal, said method comprising:
  (i) providing a kit according to claim 1,
  (ii) placing the olfactive product to be tested of the second part in the separating module comprised in the food bowl assembly,
  (iii) placing a food composition in the second feeding bowl, so as to provide an operational food bowl assembly,
  (iv) allowing a mammal to access the operational food bowl assembly obtained at step (iii),
  (v) repeating steps (i) to (iv) for each olfactive product to be tested, and
  (vi) selecting the olfactive product for which the mammal has shown preferences for the food in the second feeding bowl.

20. A food bowl assembly comprising:
  a first bowl comprising side walls and a base, the first bowl configured to receive an olfactive product;
  a second feeding bowl disposed within the first bowl and distanced from the first bowl by a gap extending around a rim of the second feeding bowl, the second feeding bowl comprising side walls and a solid base, an inner surface of said side walls of the second feeding bowl and the solid base being a closed surface; and
  a rigid separating module disposed between the first bowl and the second feeding bowl and configured to support a bottom surface the second feeding bowl to maintain the gap between the first feeding bowl and the second feeding bowl, wherein an odour chamber is defined by an interior of the separating module and an interior of the first bowl, the separating module adapted to surround the olfactive product received in the first bowl in the odour chamber, and wherein the separating module, an interior of the first bowl side walls, an exterior of the second feeding bowl side walls and the solid base form a vent fluidly coupled with the gap, the vent arranged to allow odours from the olfactive product within the separating module to exit the food bowl assembly between the first bowl and the side walls of the second feeding bowl so that odours do not pass through the closed surface of the second feeding bowl, wherein the separating module includes:
  one or more supporting regions configured to support the bottom surface of the second feeding bowl;
  an opening formed in the separating module and fluidly coupled with the odour chamber; and
  one or more channels defined between the one or more supporting regions, the one or more channels extending from the opening to at least one edge of the separating module to allow odours from the odour chamber to exit the food bowl assembly along the vent.

* * * * *